United States Patent
Chen et al.

(10) Patent No.: US 9,696,522 B2
(45) Date of Patent: Jul. 4, 2017

(54) PHOTOGRAPHING OPTICAL LENS ASSEMBLY, IMAGE CAPTURING DEVICE AND ELECTRONIC DEVICE

(71) Applicant: LARGAN PRECISION CO., LTD., Taichung (TW)

(72) Inventors: Chun-Yen Chen, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/950,058

(22) Filed: Nov. 24, 2015

(65) Prior Publication Data
US 2017/0102520 A1  Apr. 13, 2017

(30) Foreign Application Priority Data

Oct. 12, 2015  (TW) ............................. 104133394 A

(51) Int. Cl.
*G02B 9/60* (2006.01)
*G02B 13/00* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

| | | | |
|---|---|---|---|
| 5,933,286 A | 8/1999 | Yamada et al. | |
| 7,961,408 B2 | 6/2011 | Lo et al. | |
| 8,456,765 B1 | 6/2013 | Yin et al. | |
| 9,007,702 B2 | 4/2015 | Tsai | |
| 9,013,812 B2 | 4/2015 | Kubota et al. | |
| 9,036,269 B2 | 5/2015 | Yamakawa et al. | |
| 9,036,277 B2 | 5/2015 | Kubota et al. | |
| 2008/0037138 A1* | 2/2008 | Lang | G02B 13/04 359/708 |
| 2012/0069455 A1* | 3/2012 | Lin | G02B 13/0045 359/714 |
| 2014/0126070 A1 | 5/2014 | Ning | |

FOREIGN PATENT DOCUMENTS

JP  10-111454 A  4/1998
JP  2009-216956 A  9/2009

* cited by examiner

*Primary Examiner* — Thomas K Pham
*Assistant Examiner* — Kenechukwu C Obi
(74) *Attorney, Agent, or Firm* — McClure, Qualey & Rodack, LLP

(57) ABSTRACT

A photographing optical lens assembly includes, in order from an object side to an image side, a first lens element, a second lens element, a third lens element, a fourth lens element and a fifth lens element. The first lens element with negative refractive power has a concave image-side surface. The second lens element with negative refractive power has a concave image-side surface. The third lens element has positive refractive power. The fourth lens element with positive refractive power has a convex image-side surface, wherein two surfaces of the fourth lens element are both aspheric. The fifth lens element with negative refractive power has a concave object-side surface and a convex image-side surface, wherein two surfaces of the fifth lens element are both aspheric.

37 Claims, 19 Drawing Sheets

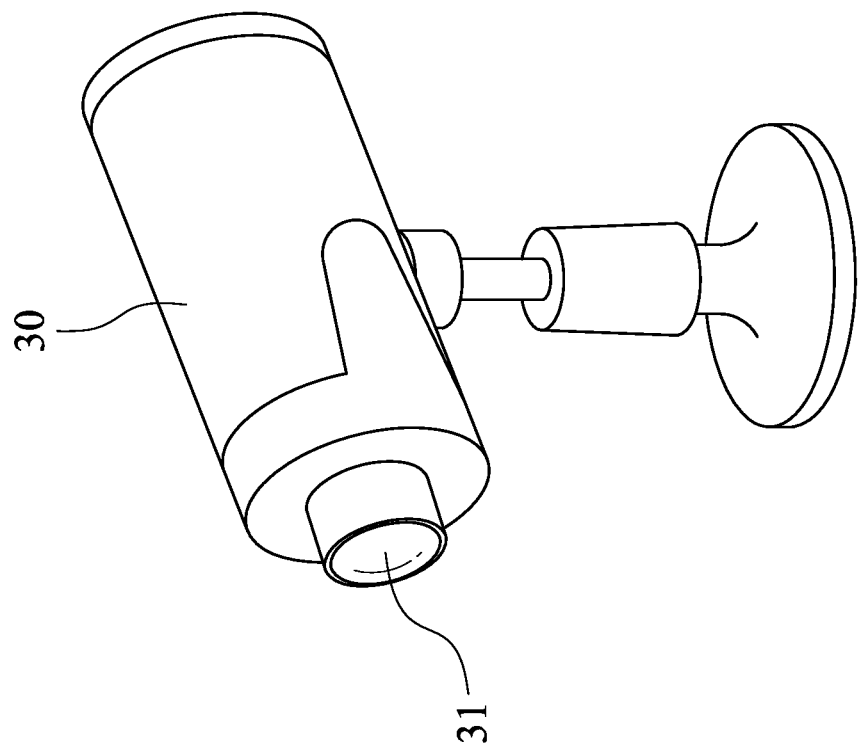

PHOTOGRAPHING OPTICAL LENS ASSEMBLY, IMAGE CAPTURING DEVICE AND ELECTRONIC DEVICE

RELATED APPLICATIONS

This application claims priority to Taiwan Application Serial Number 104133394, filed Oct. 12, 2015, which is herein incorporated by reference.

BACKGROUND

Technical Field

The present disclosure relates to a photographing optical lens assembly and an image capturing device. More particularly, the present disclosure relates to a photographing optical system and an image capturing device both with wide field of view applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

Conventional electronic products, such as driving assisting lens assemblies, surveillance systems, and sports cameras, are usually equipped with optical systems having a wide field of view characteristic corresponding to their applications and requirements thereof. However, the conventional optical systems with a wide field of view characteristic cannot satisfy the requirement of higher specifications in these products due to a smaller field of view or stop as well as insufficient resolving power.

SUMMARY

According to one aspect of the present disclosure, a photographing optical lens assembly includes, in order from an object side to an image side, a first lens element, a second lens element, a third lens element, a fourth lens element and a fifth lens element. The first lens element with negative refractive power has a concave image-side surface. The second lens element with negative refractive power has a concave image-side surface. The third lens element has positive refractive power. The fourth lens element with positive refractive power has a convex image-side surface, wherein an object-side surface and the image-side surface of the fourth lens element are both aspheric. The fifth lens element with negative refractive power has a concave object-side surface and a convex image-side surface, wherein the object-side surface and the image-side surface of the fifth lens element are both aspheric. The photographing optical lens assembly has a total of five lens elements. When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the photographing optical lens assembly is f, a focal length of the third lens element is f3, and a focal length of the fourth lens element is f4, the following conditions are satisfied:

$T12 < T34;$ $T23 < T34;$ $T45 < T34;$ $0.65 < f/f4;$ and $1.0 < f3/f4.$

According to another aspect of the present disclosure, an image capturing device includes the photographing optical lens assembly according to the aforementioned aspect and an image sensor, wherein the image sensor is disposed on an image surface of the photographing optical lens assembly.

According to yet another aspect of the present disclosure, an electronic device includes the image capturing device according to the aforementioned aspect.

BRIEF DESCRIPTION OF THE DRAWINGS

FIG. 19 is a schematic view of an electronic device according to the 10th embodiment of the present disclosure.

DETAILED DESCRIPTION

Figure 1:
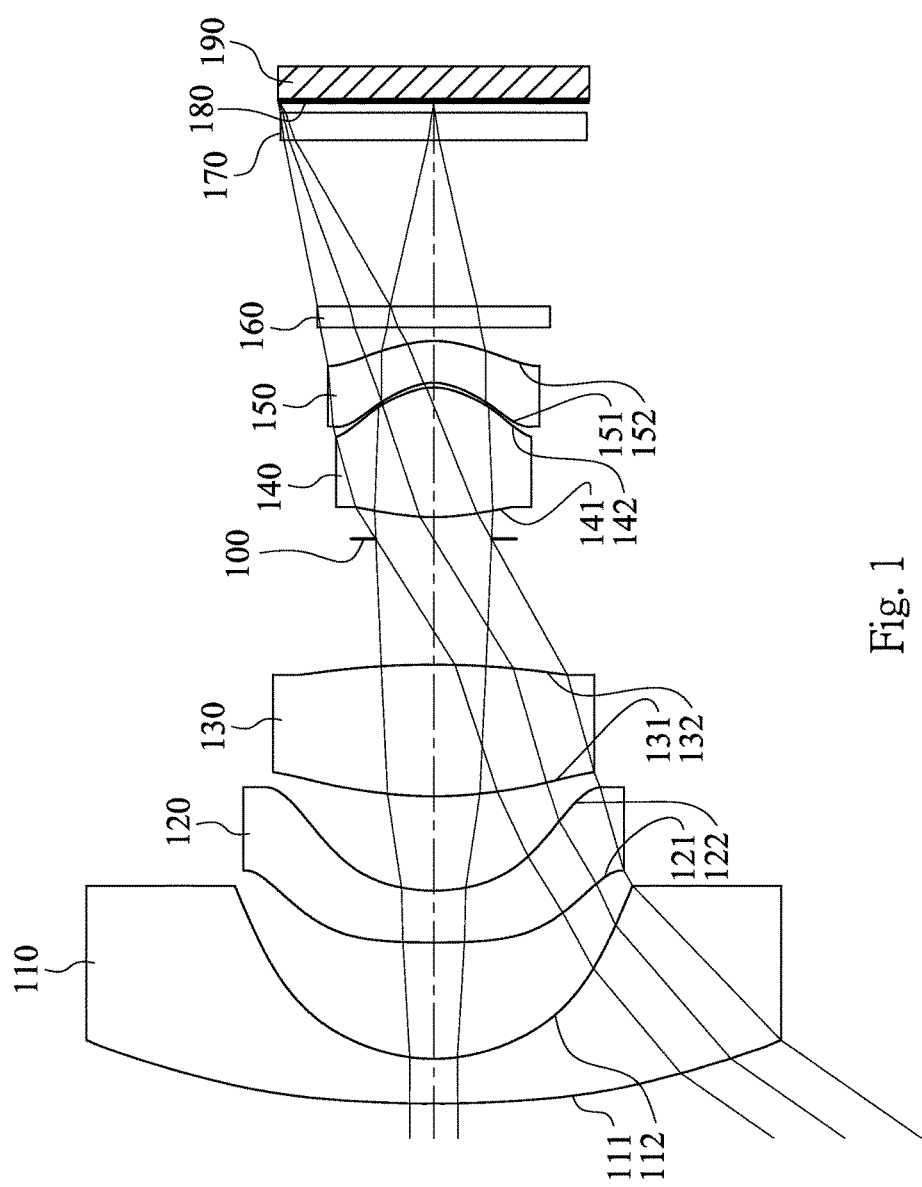
FIG. 1 is a schematic view of an image capturing device according to the 1st embodiment of the present disclosure.

A photographing optical lens assembly includes, in order from an object side to an image side, a first lens element, a second lens element, a third lens element, a fourth lens element and a fifth lens element, wherein the photographing optical lens assembly has a total of five lens elements. The photographing optical lens assembly can further include a stop, such as an aperture stop, which is disposed between the third lens element and the fourth lens element so as to enlarge the field of view.

According to the photographing optical lens assembly of the present disclosure, there is an air space between every two lens elements of the first lens element, the second lens element, the third lens element, the fourth lens element and the fifth lens element that are adjacent to each other. That is, each of the first through fifth lens elements is a single and non-cemented lens element, and every two lens elements adjacent to each other are not cemented, and there is a space between the two lens elements. Moreover, the manufacturing process of the cemented lenses is more complex than the non-cemented lenses. In other words, of the first lens element, the second lens element, the third lens element, the fourth lens element and the fifth lens element of the photographing optical lens assembly, there is a space in a paraxial region between every pair of lens elements that are adjacent to each other. In particular, a cementing surface of one lens element and a cementing surface of the following lens element need to have accurate curvatures to ensure these two lens elements will be highly cemented. However, during the cementing process, those two lens elements might not be highly cemented due to displacements and it is thereby not favorable for image quality of the photographing optical lens assembly. Therefore, according to the photographing optical lens assembly of the present disclosure, an air space in a paraxial region between every two of the first lens element, the second lens element, the third lens element, the fourth lens element and the fifth lens element that are adjacent to each other of the present disclosure avoids the problem generated by the cemented lens elements.

The first lens element with negative refractive power can have a convex object-side surface, and has a concave image-side surface. Therefore, it is favorable for convergence of the incident light so as to provide the wider field of view for the photographing optical lens assembly.

The second lens element with negative refractive power has a concave image-side surface. Therefore, it is not only favorable for convergence of the incident light so as to provide the wider field of view for the photographing optical lens assembly, but also favorable for the distribution of the negative refractive power corresponding to the negative first lens element so as to reduce the sensitivity of the photographing optical lens assembly and eliminate aberrations thereof.

The third lens element has positive refractive power, so that aberrations generated from the first lens element and the second lens element can be balanced effectively.

The fourth lens element with positive refractive power can have a convex object-side surface, and has a convex image-side surface. Therefore, the fourth lens element can provide the main positive refractive power for the photographing optical lens assembly, and reduce the total track length thereof.

The fifth lens element with negative refractive power has a concave object-side surface and a convex image-side surface, wherein the image-side surface of the fifth lens element can include at least one concave shape in an off-axial region thereof. Therefore, it is favorable for balancing the refractive power of the fourth lens element, reducing aberrations of the photographing optical lens assembly, and enhancing the light focusing of the peripheral region of the image so as to increase the resolution thereof.

When an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following conditions are satisfied: T12<T34; T23<T34; and T45<T34. Therefore, it is favorable for reducing the total track length of the photographing optical lens assembly so as to utilize the space thereof efficiently.

When a focal length of the photographing optical lens assembly is f, and a focal length of the fourth lens element is f4, the following condition is satisfied: 0.65<f/f4. Therefore, the main lens element of the photographing optical lens assembly for light convergence has sufficient refractive power, so that the incident light can be converged on an image surface effectively so as to reduce the back focal length thereof. Preferably, the following condition can be satisfied: 0.80<f/f4<2.0. Furthermore, with the aforementioned condition, the object-side surface and the image-side surface of the fourth lens element are both aspheric, so that aberrations generated by the front lens group and the characteristic of a large field of view of the photographing optical lens assembly can be corrected effectively, and the compact size and high image quality can be achieved.

When a focal length of the third lens element is f3, and a focal length of the fourth lens element is f4, and the following conditions are satisfied: 1.0<f3/f4. Therefore, it is favorable for reducing aberrations of the photographing optical lens assembly effectively, and providing the necessary positive refractive power thereof.

According to the photographing optical lens assembly of the present disclosure, at least one of the first lens element, the second lens element and the third lens element can be made of a glass material, and at least one of an object-side surface and an image-side surface of the first lens element, the second lens element and the third lens element can be spherical. Therefore, the environmental effects against the photographing optical lens assembly can be reduced, and the manufacturability can be further increased by the configuration of the spherical surface.

When a focal length of the first lens element is f1, a focal length of the second lens element is f2, the focal length of the third lens element is f3, the focal length of the fourth lens element is f4, and a focal length of the fifth lens element is f5, the following conditions are satisfied: |f4|<|f151| ; |f4 |<|f2|; |f4|<|f3|; and |f4|<|f5|. Therefore, the positive refractive power of the photographing optical lens assembly can be provided effectively so as to reduce the total track length thereof.

When an axial distance between the image-side surface of the fifth lens element and the image surface is BL, and an axial distance between the object-side surface of the fourth lens element and the image-side surface of the fifth lens element is Dr7r10, the following condition is satisfied: 0.40<BL/Dr7r10<1.75. Therefore, it is favorable for maintaining the compact size by reducing the back focal length of the photographing optical lens assembly effectively.

When a curvature radius of an object-side surface of the third lens element is R5, and a curvature radius of an image-side surface of the third lens element is R6, the following condition is satisfied: $-2.0<(R5+R6)/(R5-R6)<-0.25$. Therefore, spherical aberration generated from the first lens element and the second lens element can be corrected, and curved images can be avoided.

When the focal length of the photographing optical lens assembly is f, and a composite focal length of the first lens element, the second lens element and the third lens element is f123, the following condition is satisfied: $-0.50<f/f123<0$. Therefore, it is favorable for enlarging the field of view and increasing the peripheral illumination by allowing the incident light from wider field of view into the photographing optical lens assembly.

When an Abbe number of the third lens element is V3, the following condition is satisfied: $V3<30$. Therefore, chromatic aberration of the photographing optical lens assembly can be corrected effectively.

When a maximal field of view of the photographing optical lens assembly is FOV, the following condition is satisfied: $110$ degrees$\leq FOV \leq 200$ degrees. Therefore, the advantage of large field of view of the photographing optical lens assembly can be enhanced.

When a sum of axial distances between each two of the first lens element, the second lens element, the third lens element, the fourth lens element and the fifth lens element that are adjacent to each other is ΣAT, and an axial distance between an object-side surface of the first lens element and the image-side surface of the fifth lens element is Td, the following condition is satisfied: $\Sigma AT/Td<0.50$. Therefore, it is favorable for utilizing the space of the photographing optical lens assembly effectively and reducing the total track length thereof.

When a curvature radius of the image-side surface of the fourth lens element is R8, and a curvature radius of the object-side surface of the fifth lens element is R9, the following condition is satisfied: $|(R8+R9)/(R8-R9)|<100$. Therefore, it is favorable for eliminating aberrations and enhancing the image quality of the photographing optical lens assembly.

When the axial distance between the first lens element and the second lens element is T12, and the axial distance between the third lens element and the fourth lens element is T34, the following condition is satisfied: $1.05<T34/T12<2.5$. Therefore, it is favorable for utilizing the space of the photographing optical lens assembly effectively and reducing the total track length thereof.

When a refractive power of the first lens element is P1, a refractive power of the second lens element is P2, a refractive power of the third lens element is P3, and a refractive power of the fourth lens element is P4, the following condition is satisfied: $1.0<(P4)/(|P1|+|P2|+|P3|)<2.0$. Therefore, it is favorable for convergence of the incident light on the image surface, and reducing the back focal length so as to maintain the compact size of the photographing optical lens assembly.

When the axial distance between the first lens element and the second lens element is T12, and a distance in parallel with an optical axis from an axial vertex on the image-side surface of the first lens element to a maximum effective radius position on the image-side surface of the first lens element is Sag12, the following condition is satisfied: $1.0<Sag12/T12<2.0$. Therefore, it is favorable for reducing the axial distance between the first lens element and the second lens element so as to utilize the space effectively thereof.

According to the photographing optical lens assembly of the present disclosure, the lens elements thereof can be made of glass or plastic materials. When the lens elements are made of glass materials, the distribution of the refractive power of the photographing optical lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the photographing optical lens assembly. Therefore, the total track length of the photographing optical lens assembly can also be reduced.

According to the photographing optical lens assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof.

According to the photographing optical lens assembly of the present disclosure, the refractive power or the focal length of a lens element being positive or negative may refer to the refractive power or the focal length in a paraxial region of the lens element.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, the image surface of the photographing optical lens assembly, based on the corresponding image sensor, can be flat or curved. In particular, the image surface can be a curved surface being concave facing towards the object side.

According to the photographing optical lens assembly of the present disclosure, an aperture stop can be configured as a middle stop. A middle stop disposed between the first lens element and the image surface is favorable for enlarging the field of view of the photographing optical lens assembly and thereby provides a wider field of view for the same.

According to the photographing optical lens assembly of the present disclosure, the photographing optical lens assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing device is provided. The image capturing device includes the aforementioned photographing optical lens assembly and an image sensor, wherein the image sensor is disposed on the image side of the aforementioned photographing optical lens assembly, that is, the image sensor can be disposed on or near the image surface of the aforementioned photographing optical lens assembly. By the distribution of the refractive power of the aforementioned photographing optical lens assembly, it is favorable for convergence of the incident light on the image surface so as to maintain the compact size thereof, and providing wider field of view so as to reduce the sensitivity and aberrations. Preferably, the image capturing device can further include a barrel member, a holder member or a combination thereof.

According to the present disclosure, an electronic device is provided, which includes the aforementioned image capturing device. Therefore, image quality of the electronic device can be improved. Preferably, the electronic device can further include but not limited to a control unit, a display, a storage unit, a random access memory unit (RAM) or a combination thereof.

According to the above description of the present disclosure, the following 1st-10th specific embodiments are provided for further explanation.

1st Embodiment

Figure 2:
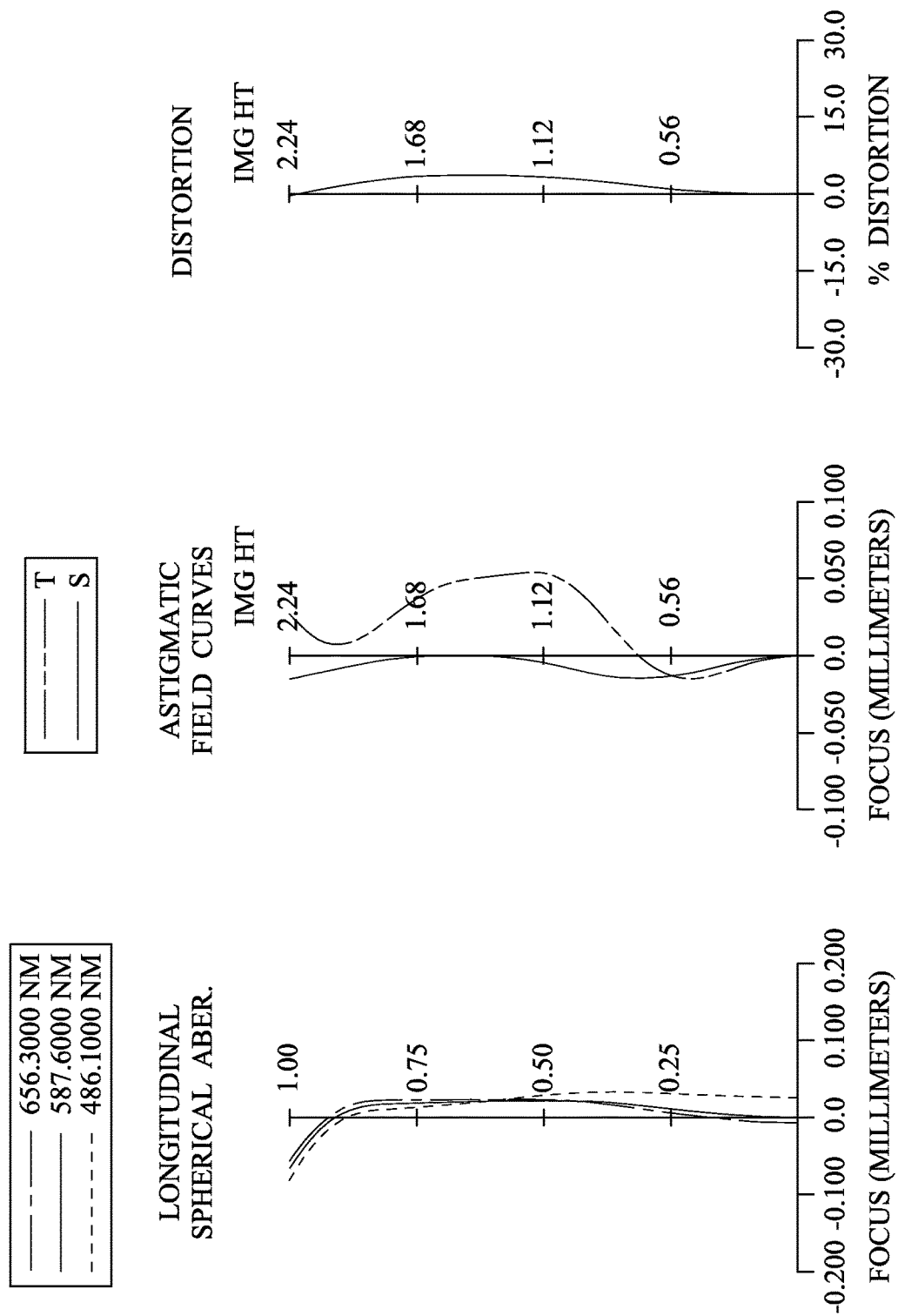
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes a photographing optical lens assembly (its reference numeral is omitted) and an image sensor 190. The photographing optical lens assembly includes, in order from an object side to an image side, a first lens element 110, a second lens element 120, a third lens element 130, an aperture stop 100, a fourth lens element 140, a fifth lens element 150, an IR-cut filter 160, a cover glass 170 and an image surface 180, wherein the image sensor 190 is disposed on the image surface 180 of the photographing optical lens assembly. The photographing optical lens assembly has a total of five lens elements (110-150). There is an air space in a paraxial region between every two of the first lens element 110, the second lens element 120, the third lens element 130, the fourth lens element 140 and the fifth lens element 150 that are adjacent to each other.

The first lens element 110 with negative refractive power has a convex object-side surface 111 and a concave image-side surface 112. The first lens element 110 is made of a plastic material, and has the object-side surface 111 and the image-side surface 112 being both aspheric.

The second lens element 120 with negative refractive power has a convex object-side surface 121 and a concave image-side surface 122. The second lens element 120 is made of a plastic material and has the object-side surface 121 and the image-side surface 122 being both aspheric.

The third lens element 130 with positive refractive power has a convex object-side surface 131 and a convex image-side surface 132. The third lens element 130 is made of a plastic material, and has the object-side surface 131 and the image-side surface 132 being both aspheric.

The fourth lens element 140 with positive refractive power has a convex object-side surface 141 and a convex image-side surface 142. The fourth lens element 140 is made of a plastic material, and has the object-side surface 141 and the image-side surface 142 being both aspheric.

The fifth lens element 150 with negative refractive power has a concave object-side surface 151 and a convex image-side surface 152. The fifth lens element 150 is made of a plastic material, and has the object-side surface 151 and the image-side surface 152 being both aspheric. Furthermore, the image-side surface 152 of the fifth lens element 150 includes at least one concave shape in an off-axial region thereof.

The IR-cut filter 160 is made of a glass material, the IR-cut filter 160 and the cover glass 170 are located between the fifth lens element 150 and the image surface 180 in order, and will not affect the focal length of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens assembly according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=1.57 mm; Fno=2.25; and HFOV=55.0 degrees.

In the photographing optical lens assembly according to the 1st embodiment, when a maximal field of view of the photographing optical lens assembly is FOV, the following condition is satisfied: FOV=110.0 degrees.

In the photographing optical lens assembly according to the 1st embodiment, when an Abbe number of the third lens element 130 is V3, the following condition is satisfied: V3=23.5.

In the photographing optical lens assembly according to the 1st embodiment, when an axial distance between the first lens element 110 and the second lens element 120 is T12, and an axial distance between the third lens element 130 and the fourth lens element 140 is T34, the following condition is satisfied: T34/T12=1.27.

Figure 15:
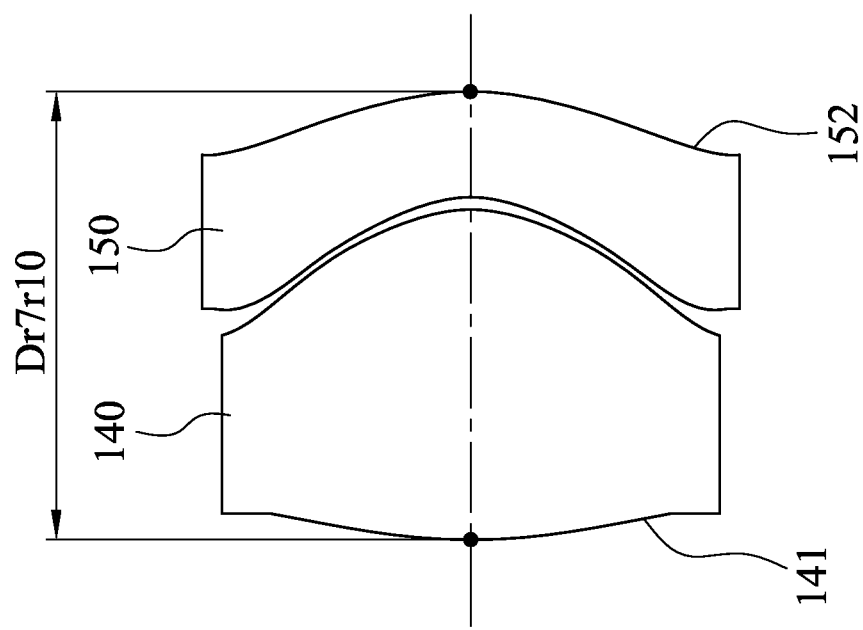
FIG. 15 is a schematic view of a parameter Dr7r10 according to the 1st embodiment of FIG. 1.

FIG. 15 is a schematic view of a parameter Dr7r10 according to the 1st embodiment of FIG. 1. In FIG. 15, when an axial distance between the object-side surface 141 of the fourth lens element 140 and the image-side surface 152 of the fifth lens element 150 is Dr7r10, and an axial distance between the image-side surface 152 of the fifth lens element 150 and the image surface 180 is BL, the following condition is satisfied: BL/Dr7r10=1.36.

In the photographing optical lens assembly according to the 1st embodiment, when the axial distance between the first lens element 110 and the second lens element 120 is T12, an axial distance between the second lens element 120 and the third lens element 130 is T23, the axial distance between the third lens element 130 and the fourth lens element 140 is T34, an axial distance between the fourth lens element 140 and the fifth lens element 150 is T45, a sum of axial distances between each two of the first lens element 110, the second lens element 120, the third lens element 130, the fourth lens element 140 and the fifth lens element 150 that are adjacent to each other is ΣAT (ΣAT=T12+T23+T34+T45), and an axial distance between the object-side surface 111 of the first lens element 110 and the image-side surface 152 of the fifth lens element 150 is Td, the following condition is satisfied: ΣAT/Td=0.48.

Figure 16:
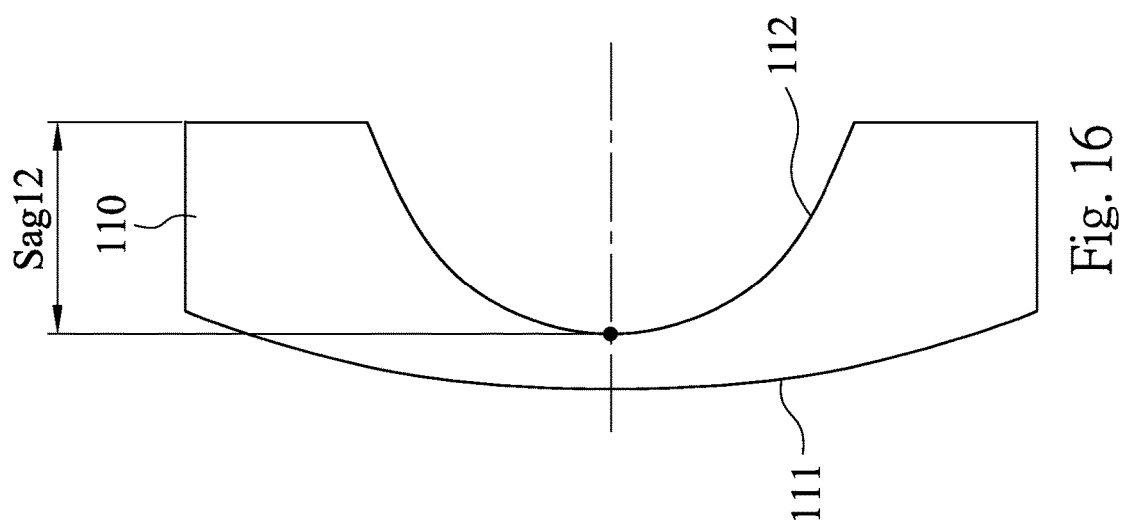
FIG. 16 is a schematic view of a parameter Sag12 according to the 1st embodiment of FIG. 1.

FIG. 16 is a schematic view of a parameter Sag12 according to the 1st embodiment of FIG. 1. In FIG. 16, a distance in parallel with an optical axis from an axial vertex on the image-side surface 112 of the first lens element 110 to a maximum effective radius position on the image-side surface 112 of the first lens element 110 is Sag12 (when the distance towards the image side, Sag12 is positive; when the distance towards the object side, Sag12 is negative), and the axial distance between the first lens element 110 and the second lens element 120 is T12, the following condition is satisfied: Sag12/T12=1.49.

In the photographing optical lens assembly according to the 1st embodiment, when a curvature radius of the object-side surface 131 of the third lens element 130 is R5, and a curvature radius of the image-side surface 132 of the third lens element 130 is R6, the following condition is satisfied: (R5+R6)/(R5−R6)=−0.43.

In the photographing optical lens assembly according to the 1st embodiment, when a curvature radius of the image-side surface 142 of the fourth lens element 140 is R8, and a curvature radius of the object-side surface 151 of the fifth lens element 150 is R9, the following condition is satisfied: |(R8+R9)/(R8−R9)|=15.36.

In the photographing optical lens assembly according to the 1st embodiment, when the focal length of the photographing optical lens assembly is f, a focal length of the third lens element 130 is f3, and a focal length of the fourth lens element 140 is f4, the following conditions are satisfied: f/f4=1.09; and f3/f4=4.78.

In the photographing optical lens assembly according to the 1st embodiment, when the focal length of the photographing optical lens assembly is f, and a composite focal length of the first lens element 110, the second lens element 120 and the third lens element 130 is f123, the following condition is satisfied: f/f123=−0.19.

In the photographing optical lens assembly according to the 1st embodiment, when a refractive power of the first lens element 110 is P1 (which is a ratio value f/f1 of the focal length of the photographing optical lens assembly f and the focal length of the first lens element f1), a refractive power of the second lens element 120 is P2 (which is a ratio value f/f2 of the focal length of the photographing optical lens assembly f and the focal length of the second lens element f2), a refractive power of the third lens element 130 is P3 (which is a ratio value f/f3 of the focal length of the photographing optical lens assembly f and the focal length of the third lens element f3), and a refractive power of the fourth lens element 140 is P4 (which is a ratio value f/f4 of the focal length of the photographing optical lens assembly f and the focal length of the fourth lens element f4), the following condition is satisfied: (P4)/(|P1|+|P2|+|P3|)=1.40.

In the photographing optical lens assembly according to the 1st embodiment, when the axial distance between the first lens element 110 and the second lens element 120 is T12, the axial distance between the second lens element 120 and the third lens element 130 is T3, the axial distance between the third lens element 130 and the fourth lens element 140 is T34, and the axial distance between the fourth lens element 140 and the fifth lens element 150 is T45, the following conditions are satisfied: T12<T34; T23<T34; and T45<T34.

In the photographing optical lens assembly according to the 1st embodiment, when the focal length of the first lens element 110 is f1, the focal length of the second lens element 120 is f2, the focal length of the third lens element 130 is f3, the focal length of the fourth lens element 140 is f4, and a focal length of the fifth lens element 150 is f5, the following conditions are satisfied: |f4|<|f1|; |f4|<|f2|; |f4|<|f3|; and |f4|<|f5|.

The detailed optical data of the 1st embodiment are shown in Table 1 and the aspheric surface data are shown in Table 2 below.

TABLE 1

1st Embodiment
f = 1.57 mm, Fno = 2.25, HFOV = 55.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 18.040 | ASP | 0.650 | Plastic | 1.544 | 55.9 | −5.90 |
| 2 | | 2.693 | ASP | 1.679 | | | | |
| 3 | Lens 2 | 17.314 | ASP | 0.750 | Plastic | 1.544 | 55.9 | −5.54 |
| 4 | | 2.529 | ASP | 1.364 | | | | |
| 5 | Lens 3 | 5.931 | ASP | 1.900 | Plastic | 1.639 | 23.5 | 6.89 |
| 6 | | −14.933 | ASP | 1.817 | | | | |
| 7 | Ape. Stop | Plano | | 0.317 | | | | |
| 8 | Lens 4 | 3.555 | ASP | 1.874 | Plastic | 1.544 | 55.9 | 1.44 |
| 9 | | −0.820 | ASP | 0.070 | | | | |
| 10 | Lens 5 | −0.720 | ASP | 0.600 | Plastic | 1.661 | 20.4 | −2.59 |
| 11 | | −1.657 | ASP | 0.200 | | | | |
| 12 | IR-cut filter | Plano | | 0.300 | Glass | 1.517 | 64.2 | — |
| 13 | | Plano | | 2.400 | | | | |
| 14 | Cover glass | Plano | | 0.400 | Glass | 1.517 | 64.2 | — |
| 15 | | Plano | | 0.172 | | | | |
| 16 | Image | Plano | | — | | | | |

Reference wavelength is 587.6 nm (d-line).

TABLE 2

Aspheric Coefficients

| | \ \ \ \ \ \ \ \ \ \ \ \ Surface # | | | | |
|---|---|---|---|---|---|
| | 1 | 2 | 3 | 4 | 5 |
| k = | 6.5145E+00 | −1.1942E+00 | −8.7454E+00 | −9.3499E−01 | −1.3337E+01 |
| A4 = | −9.7484E−04 | 6.5352E−03 | 2.6989E−02 | 1.4841E−02 | −2.2606E−04 |
| A6 = | 3.8224E−04 | −1.3537E−03 | 1.4901E−03 | 2.5839E−02 | 9.4554E−04 |
| A8 = | −4.1297E−05 | 6.2068E−04 | −3.5960E−04 | −9.5060E−03 | −9.7893E−05 |
| A10 = | 2.2199E−06 | 2.4091E−05 | −3.8652E−06 | 1.2454E−03 | −1.0182E−05 |
| A12 = | −6.8215E−08 | −1.6755E−05 | −1.8889E−06 | −8.8391E−05 | −2.2238E−15 |
| A14 = | 1.1639E−09 | 1.4731E−06 | 1.9091E−07 | 3.3404E−06 | −2.3741E−17 |
| A16 = | −8.4315E−12 | −4.5899E−08 | | | |

| | \ \ \ \ \ \ \ \ \ \ \ \ Surface # | | | | |
|---|---|---|---|---|---|
| | 6 | 8 | 9 | 10 | 11 |
| k = | 4.7160E+01 | 2.7070E+00 | −7.2490E−01 | −2.7064E+00 | −5.8384E+00 |
| A4 = | −2.5719E−03 | −3.0017E−02 | 6.7578E−01 | 2.0162E−01 | −2.1467E−03 |
| A6 = | 1.8781E−03 | 6.3401E−02 | −9.2754E−01 | −4.6974E−01 | −4.0572E−03 |
| A8 = | −6.4863E−04 | −1.8262E−01 | 7.6847E−01 | 3.5288E−01 | 5.0385E−03 |
| A10 = | 2.7174E−04 | 2.2834E−01 | −3.4110E−01 | −9.9922E−02 | −6.6947E−04 |
| A12 = | −9.1794E−05 | −1.4577E−01 | 8.4860E−02 | 9.4345E−03 | 2.0056E−04 |
| A14 = | 1.4220E−05 | 3.7044E−02 | −8.6098E−03 | | |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the term definitions of the tables are the same as Table 1 and Table 2 of the 1st embodiment. Therefore, an explanation in this regard will not be provided again.

2nd Embodiment

Figure 3:
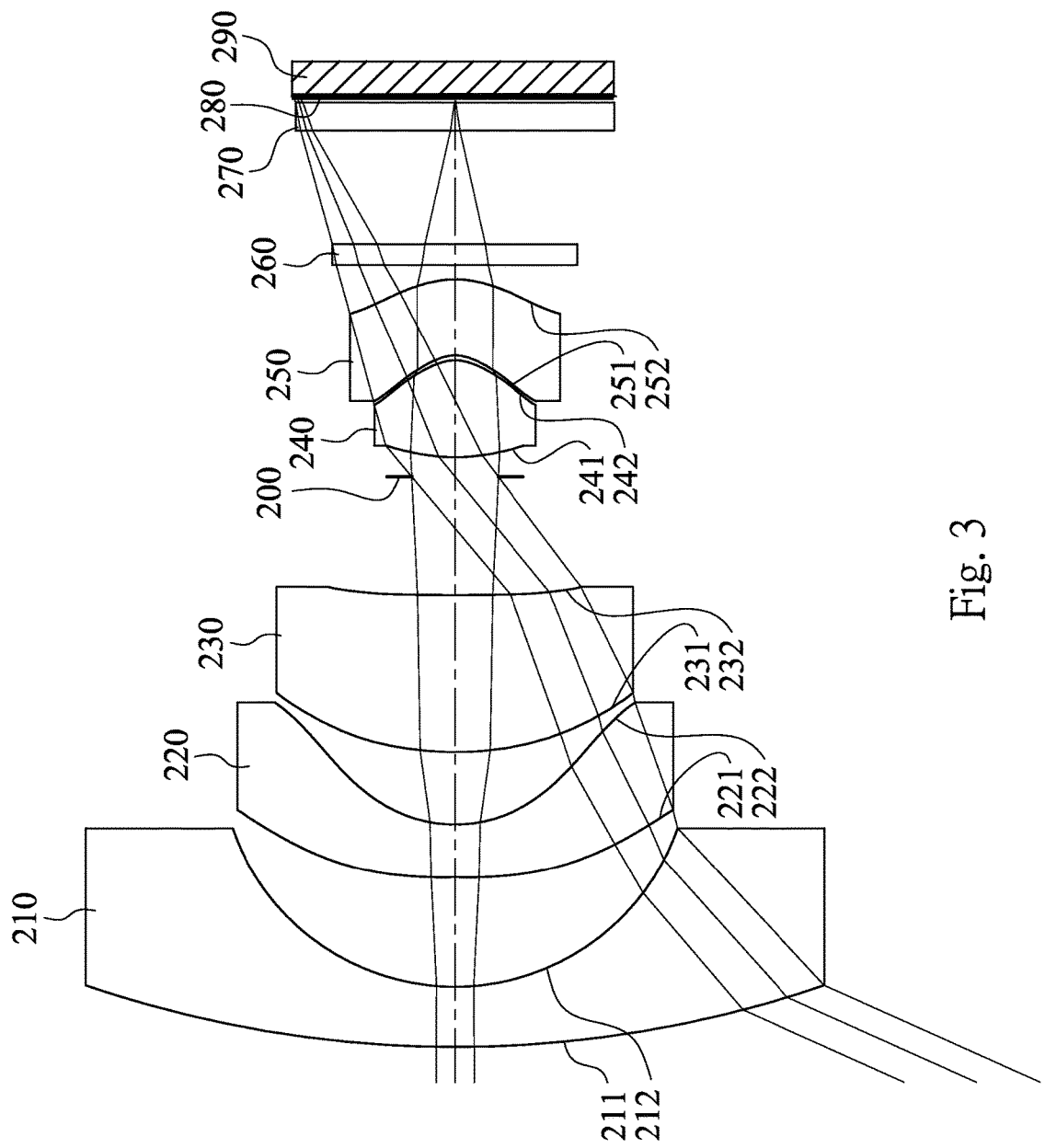
FIG. 3 is a schematic view of an image capturing device according to the 2nd embodiment of the present disclosure.
Figure 4:
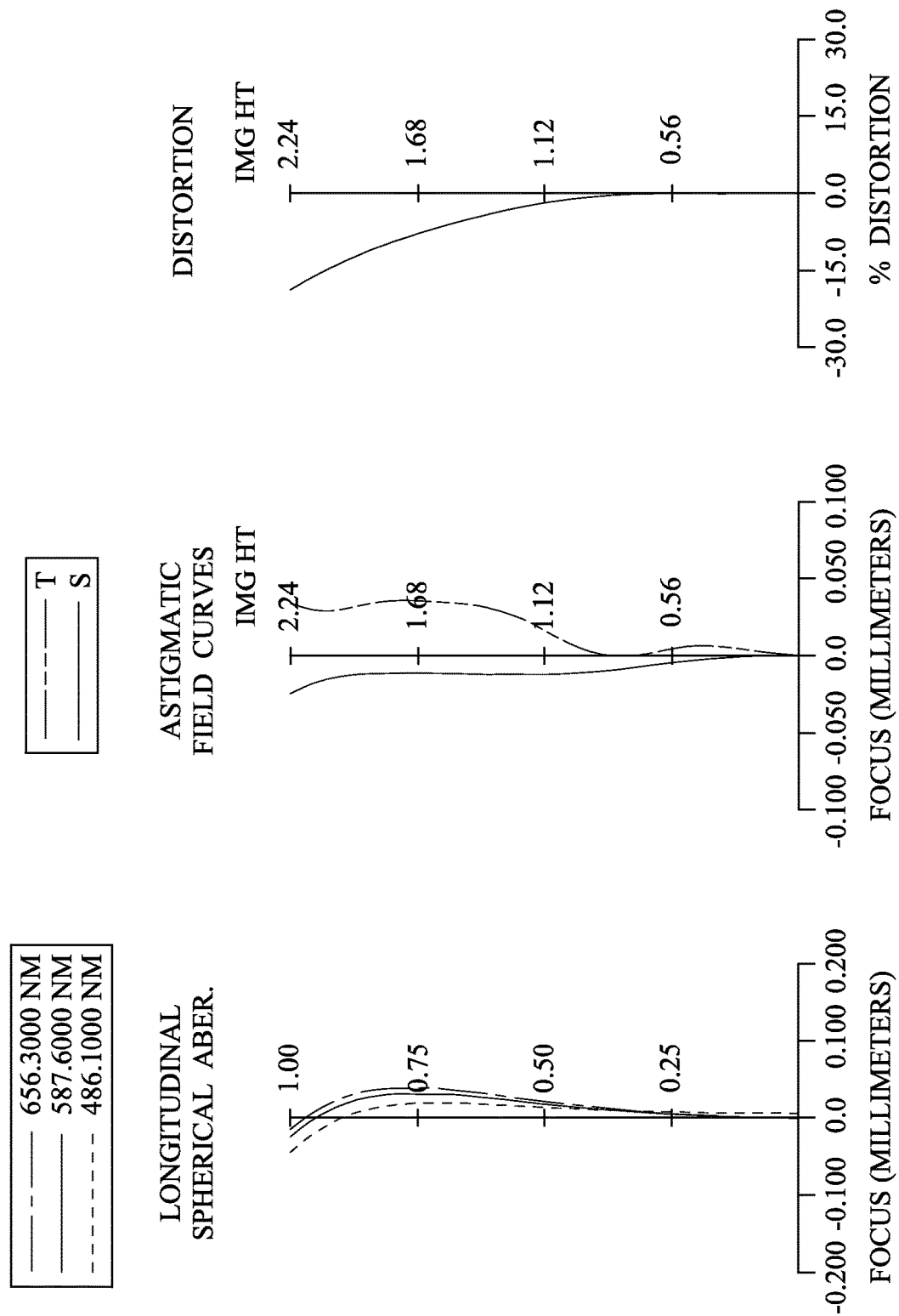
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes a photographing optical lens assembly (its reference numeral is omitted) and an image sensor 290. The photographing optical lens assembly includes, in order from an object side to an image side, a first lens element 210, a second lens element 220, a third lens element 230, an aperture stop 200, a fourth lens element 240, a fifth lens element 250, an IR-cut filter 260, a cover glass 270 and an image surface 280, wherein the image sensor 290 is disposed on the image surface 280 of the photographing optical lens assembly. The photographing optical lens assembly has a total of five lens elements (210-250). There is an air space in a paraxial region between every two of the first lens element 210, the second lens element 220, the third lens element 230, the fourth lens element 240 and the fifth lens element 250 that are adjacent to each other.

The first lens element 210 with negative refractive power has a convex object-side surface 211 and a concave image-side surface 212. The first lens element 210 is made of a glass material, and has the object-side surface 211 and the image-side surface 212 being both spherical.

The second lens element 220 with negative refractive power has a convex object-side surface 221 and a concave image-side surface 222. The second lens element 220 is made of a plastic material and has the object-side surface 221 and the image-side surface 222 being both aspheric.

The third lens element 230 with positive refractive power has a convex object-side surface 231 and a concave image-side surface 232. The third lens element 230 is made of a glass material, and has the object-side surface 231 and the image-side surface 232 being both aspheric.

The fourth lens element 240 with positive refractive power has a convex object-side surface 241 and a convex image-side surface 242. The fourth lens element 240 is made of a plastic material, and has the object-side surface 241 and the image-side surface 242 being both aspheric.

The fifth lens element 250 with negative refractive power has a concave object-side surface 251 and a convex image-side surface 252. The fifth lens element 250 is made of a plastic material, and has the object-side surface 251 and the image-side surface 252 being both aspheric. Furthermore, the image-side surface 252 of the fifth lens element 250 includes at least one concave shape in an off-axial region thereof.

The IR-cut filter 260 is made of a glass material, the IR-cut filter 260 and the cover glass 270 are located between the fifth lens element 250 and the image surface 280 in order, and will not affect the focal length of the photographing optical lens assembly.

The detailed optical data of the 2nd embodiment are shown in Table 3 and the aspheric surface data are shown in Table 4 below.

TABLE 3

2nd Embodiment
f = 1.23 mm, Fno = 2.30, HFOV = 65.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 16.115 | | 0.850 | Glass | 1.788 | 47.5 | −5.49 |
| 2 | | 3.331 | | 1.552 | | | | |
| 3 | Lens 2 | 14.859 | ASP | 0.750 | Plastic | 1.544 | 55.9 | −4.34 |
| 4 | | 1.998 | ASP | 1.027 | | | | |
| 5 | Lens 3 | 4.970 | ASP | 2.226 | Glass | 2.002 | 20.7 | 5.33 |
| 6 | | 56.338 | ASP | 1.674 | | | | |
| 7 | Ape. Stop | Plano | | 0.275 | | | | |
| 8 | Lens 4 | 2.650 | ASP | 1.372 | Plastic | 1.544 | 55.9 | 1.05 |
| 9 | | −0.595 | ASP | 0.070 | | | | |
| 10 | Lens 5 | −0.547 | ASP | 1.081 | Plastic | 1.639 | 23.5 | −2.63 |
| 11 | | −1.437 | ASP | 0.200 | | | | |
| 12 | IR-cut filter | Plano | | 0.300 | Glass | 1.517 | 64.2 | — |
| 13 | | Plano | | 1.600 | | | | |
| 14 | Cover glass | Plano | | 0.400 | Glass | 1.517 | 64.2 | — |
| 15 | | Plano | | 0.087 | | | | |
| 16 | Image | Plano | | — | | | | |

Reference wavelength is 587.6 nm (d-line).

TABLE 4

Aspheric Coefficients

| | Surface # | | | |
|---|---|---|---|---|
| | 3 | 4 | 5 | 6 |
| k = | 8.8818E+00 | −7.7009E−01 | 2.0517E+00 | −1.0000E+00 |
| A4 = | 2.4637E−02 | 2.3640E−02 | 1.3783E−03 | 1.0858E−02 |
| A6 = | −5.0123E−03 | −3.2160E−03 | 8.9419E−04 | −1.2760E−03 |
| A8 = | 7.1385E−04 | 3.3096E−04 | −1.5171E−04 | −3.4873E−04 |
| A10 = | −7.0362E−05 | −1.5612E−04 | −3.4552E−05 | 1.4926E−04 |
| A12 = | 4.3423E−06 | 1.2008E−05 | 4.3874E−06 | 3.4399E−06 |
| A14 = | −1.2856E−07 | 2.2566E−07 | −1.3839E−08 | −4.3707E−16 |
| A16 = | | | −2.0729E−10 | −8.0618E−18 |

| | Surface # | | | |
|---|---|---|---|---|
| | 8 | 9 | 10 | 11 |
| k = | −2.1054E+01 | −8.6216E−01 | −1.9123E+00 | −5.9991E−01 |
| A4 = | 9.6610E−02 | 9.4525E−01 | 3.0429E−01 | 8.7235E−02 |
| A6 = | −6.1612E−02 | −1.1323E+00 | −5.9312E−01 | −2.4183E−02 |
| A8 = | −1.1153E−01 | 8.4846E−01 | 4.4429E−01 | 1.5537E−02 |
| A10 = | 3.0044E−01 | −3.3252E−01 | −1.1627E−01 | −2.8897E−03 |
| A12 = | −2.5518E−01 | 8.4860E−02 | 9.4345E−03 | 5.5555E−05 |
| A14 = | 7.5880E−02 | −8.6098E−03 | | |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.23 | Sag12/T12 | 1.45 |
| Fno | 2.30 | (R5 + R6)/(R5 − R6) | −1.19 |
| HFOV [deg.] | 65.8 | |(R8 + R9)/(R8 − R9)| | 23.76 |

-continued

| 2nd Embodiment | | | |
|---|---|---|---|
| FOV [deg.] | 131.6 | f/f4 | 1.17 |
| V3 | 20.7 | f3/f4 | 5.08 |
| T34/T12 | 1.26 | f/f123 | −0.20 |
| BL/Dr7r10 | 1.03 | (P4)/(|P1| + |P2| + |P3|) | 1.59 |
| ΣAT/Td | 0.42 | | |

Moreover, in the photographing optical lens assembly according to the 2nd embodiment, when the axial distance between the first lens element 210 and the second lens element 220 is T12, the axial distance between the second lens element 220 and the third lens element 230 is T23, the axial distance between the third lens element 230 and the fourth lens element 240 is T34, and the axial distance between the fourth lens element 240 and the fifth lens element 250 is T45, the following conditions are satisfied: T12<T34; T23<T34; and T45<T34.

Furthermore, in the photographing optical lens assembly according to the 2nd embodiment, when the focal length of the first lens element 210 is f1, the focal length of the second lens element 220 is f2, the focal length of the third lens element 230 is f3, the focal length of the fourth lens element 240 is f4, and a focal length of the fifth lens element 250 is f5, the following conditions are satisfied: |f4|<|f1|; |f4|<|f2|; |f4|<|f3|; and |f4|<|f5|.

3rd Embodiment

Figure 5:
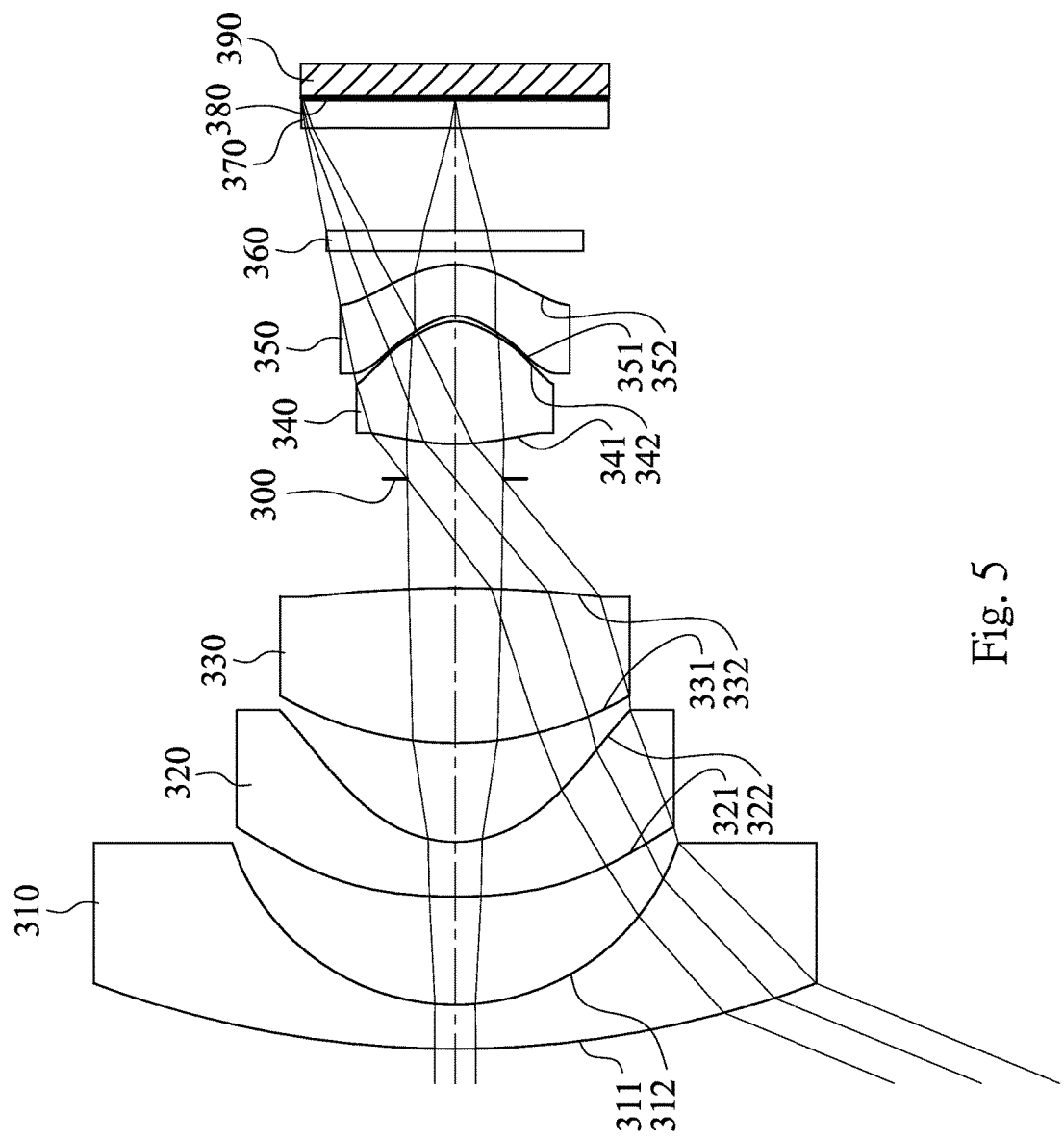
FIG. 5 is a schematic view of an image capturing device according to the 3rd embodiment of the present disclosure.
Figure 6:
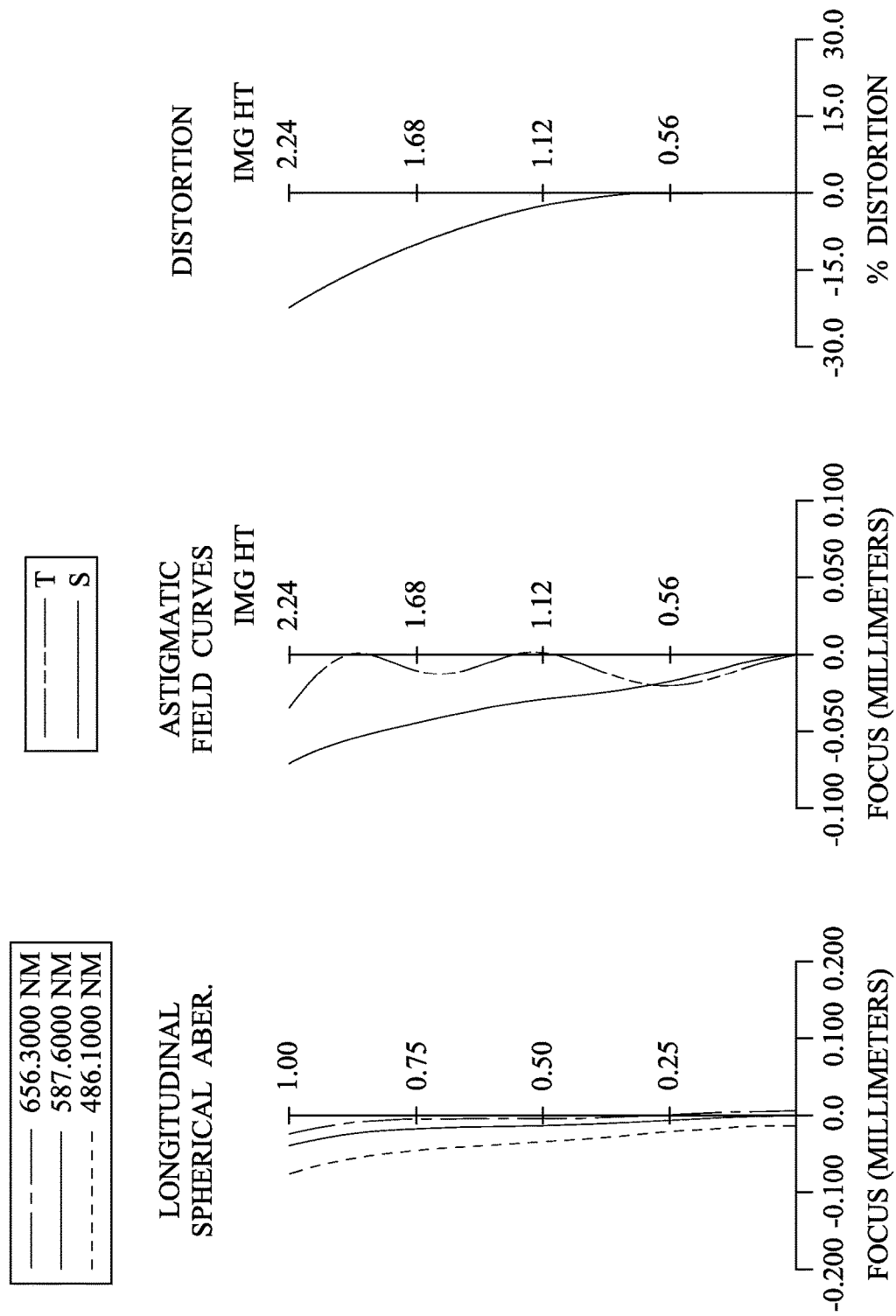
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes a photographing optical lens assembly (its reference numeral is omitted) and an image sensor 390. The photographing optical lens assembly includes, in order from an object side to an image side, a first lens element 310, a second lens element 320, a third lens element 330, an aperture stop 300, a fourth lens element 340, a fifth lens element 350, an IR-cut filter 360, a cover glass 370 and an image surface 380, wherein the image sensor 390 is disposed on the image surface 380 of the photographing optical lens assembly. The photographing optical lens assembly has a total of five lens elements (310-350). There is an air space in a paraxial region between every two of the first lens element 310, the second lens element 320, the third lens element 330, the fourth lens element 340 and the fifth lens element 350 that are adjacent to each other.

The first lens element 310 with negative refractive power has a convex object-side surface 311 and a concave image-side surface 312. The first lens element 310 is made of a glass material, and has the object-side surface 311 and the image-side surface 312 being both spherical.

The second lens element 320 with negative refractive power has a convex object-side surface 321 and a concave image-side surface 322. The second lens element 320 is made of a plastic material and has the object-side surface 321 and the image-side surface 322 being both aspheric.

The third lens element 330 with positive refractive power has a convex object-side surface 331 and a convex image-side surface 332. The third lens element 330 is made of a glass material, and has the object-side surface 331 and the image-side surface 332 being both spherical.

The fourth lens element 340 with positive refractive power has a convex object-side surface 341 and a convex image-side surface 342. The fourth lens element 340 is made of a plastic material, and has the object-side surface 341 and the image-side surface 342 being both aspheric.

The fifth lens element 350 with negative refractive power has a concave object-side surface 351 and a convex image-side surface 352. The fifth lens element 350 is made of a plastic material, and has the object-side surface 351 and the image-side surface 352 being both aspheric. Furthermore, the image-side surface 352 of the fifth lens element 350 includes at least one concave shape in an off-axial region thereof.

The IR-cut filter 360 is made of a glass material, the IR-cut filter 360 and the cover glass 370 are located between the fifth lens element 350 and the image surface 380 in order, and will not affect the focal length of the photographing optical lens assembly.

The detailed optical data of the 3rd embodiment are shown in Table 5 and the aspheric surface data are shown in Table 6 below.

TABLE 5

3rd Embodiment
f = 1.20 mm, Fno = 2.00, HFOV = 67.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 14.862 | | 0.650 | Glass | 1.804 | 46.5 | −5.67 |
| 2 | | 3.423 | | 1.576 | | | | |
| 3 | Lens 2 | 9.554 | ASP | 0.795 | Plastic | 1.535 | 55.7 | −4.25 |
| 4 | | 1.784 | ASP | 1.443 | | | | |
| 5 | Lens 3 | 5.013 | | 2.260 | Glass | 1.847 | 23.8 | 4.86 |
| 6 | | −18.195 | | 1.590 | | | | |
| 7 | Ape. Stop | Plano | | 0.518 | | | | |
| 8 | Lens 4 | 3.362 | ASP | 1.785 | Plastic | 1.535 | 55.7 | 1.17 |
| 9 | | −0.630 | ASP | 0.082 | | | | |
| 10 | Lens 5 | −0.550 | ASP | 0.743 | Plastic | 1.639 | 23.5 | −2.60 |
| 11 | | −1.256 | ASP | 0.200 | | | | |
| 12 | IR-cut filter | Plano | | 0.300 | Glass | 1.517 | 64.2 | — |
| 13 | | Plano | | 1.500 | | | | |
| 14 | Cover glass | Plano | | 0.400 | Glass | 1.517 | 64.2 | — |
| 15 | | Plano | | 0.032 | | | | |
| 16 | Image | Plano | | — | | | | |

Reference wavelength is 587.6 nm (d-line).

TABLE 6

Aspheric Coefficients

| | Surface # | | |
|---|---|---|---|
| | 3 | 4 | 8 |
| k = | −1.7905E+00 | −9.9502E−01 | 4.1481E+00 |
| A4 = | 1.8195E−02 | 2.0912E−02 | −4.8923E−02 |
| A6 = | −3.9927E−03 | −4.6263E−03 | 7.4498E−02 |
| A8 = | 6.6083E−04 | 7.2934E−04 | −1.7525E−01 |
| A10 = | −7.1042E−05 | −9.8924E−05 | 1.4915E−01 |
| A12 = | 4.2980E−06 | 2.7672E−06 | −5.9690E−02 |
| A14 = | −1.1410E−07 | 2.4571E−07 | 9.9193E−03 |

TABLE 6-continued

Aspheric Coefficients

| | Surface # | | |
|---|---|---|---|
| | 9 | 10 | 11 |
| k = | −1.2251E+00 | −2.1880E+00 | −3.4149E+00 |
| A4 = | 7.6701E−01 | 2.9293E−01 | −5.7170E−03 |
| A6 = | −1.1133E+00 | −5.5317E−01 | −1.7631E−02 |
| A8 = | 8.1651E−01 | 3.7115E−01 | 1.5292E−02 |
| A10 = | −3.4900E−01 | −1.0011E−01 | −2.1006E−03 |
| A12 = | 8.4860E−02 | 9.4345E−03 | −1.3137E−04 |
| A14 = | −8.6098E−03 | | |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.20 | Sag12/T12 | 1.50 |
| Fno | 2.00 | (R5 + R6)/(R5 − R6) | −0.57 |
| HFOV [deg.] | 67.5 | |(R8 + R9)/(R8 − R9)| | 14.74 |
| FOV [deg.] | 135.0 | f/f4 | 1.03 |
| V3 | 23.8 | f3/f4 | 4.15 |
| T34/T12 | 1.34 | f/f123 | −0.06 |
| BL/Dr7r10 | 0.93 | (P4)/(|P1| + |P2| +|P3|) | 1.38 |
| ΣAT/Td | 0.46 | | |

Moreover, in the photographing optical lens assembly according to the 3rd embodiment, when the axial distance between the first lens element 310 and the second lens element 320 is T12, the axial distance between the second lens element 320 and the third lens element 330 is T23, the axial distance between the third lens element 330 and the fourth lens element 340 is T34, and the axial distance between the fourth lens element 340 and the fifth lens element 350 is T45, the following conditions are satisfied: T12<T34; T23<T34; and T45<T34.

Furthermore, in the photographing optical lens assembly according to the 3rd embodiment, when the focal length of the first lens element 310 is f1, the focal length of the second lens element 320 is f2, the focal length of the third lens element 330 is f3, the focal length of the fourth lens element 340 is f4, and a focal length of the fifth lens element 350 is f5, the following conditions are satisfied: |f4|<|f1|; |f4|<|f2|; |f4|<|f3|; and |f4|<|f5|.

4th Embodiment

Figure 7:
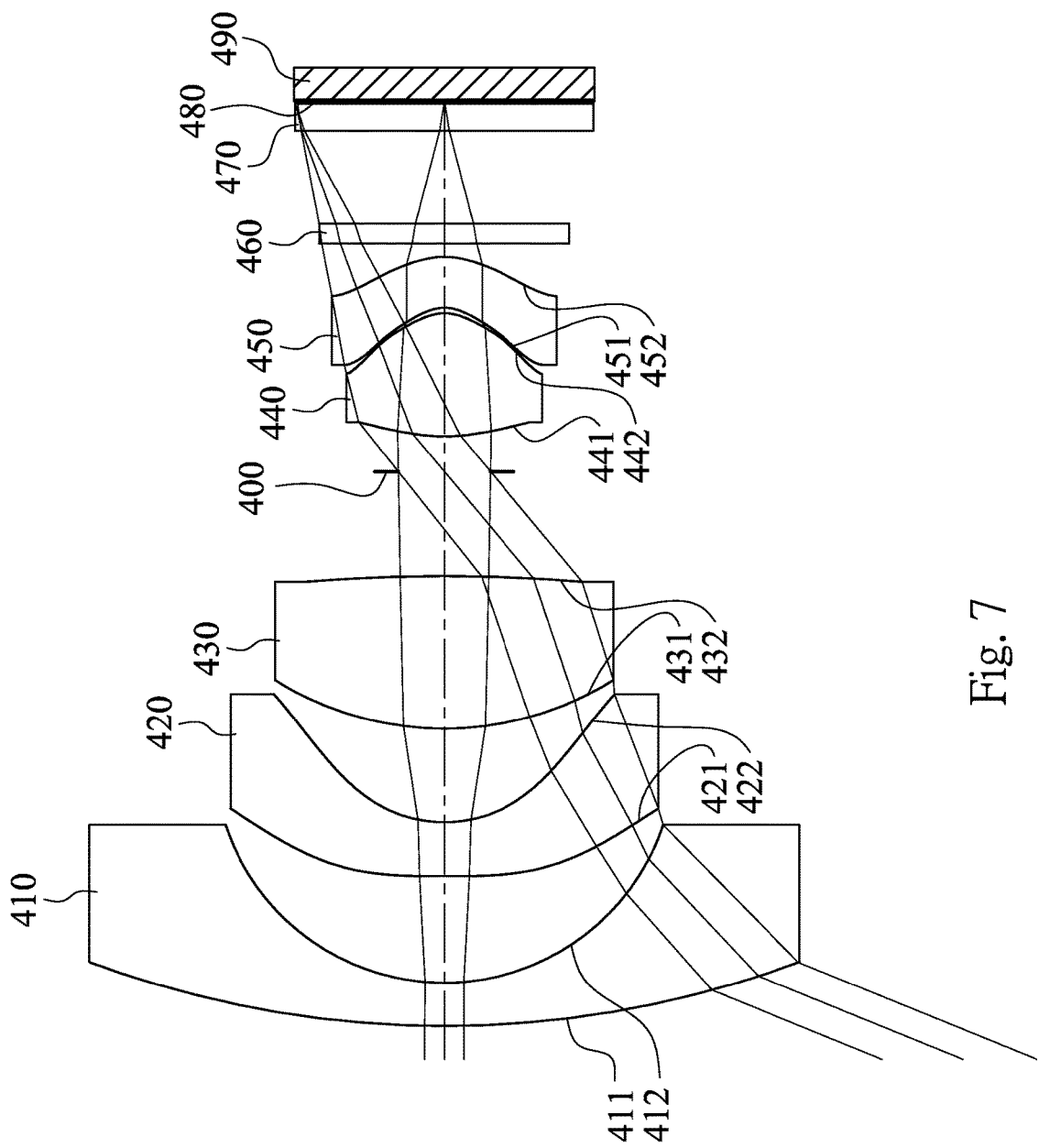
FIG. 7 is a schematic view of an image capturing device according to the 4th embodiment of the present disclosure.
Figure 8:
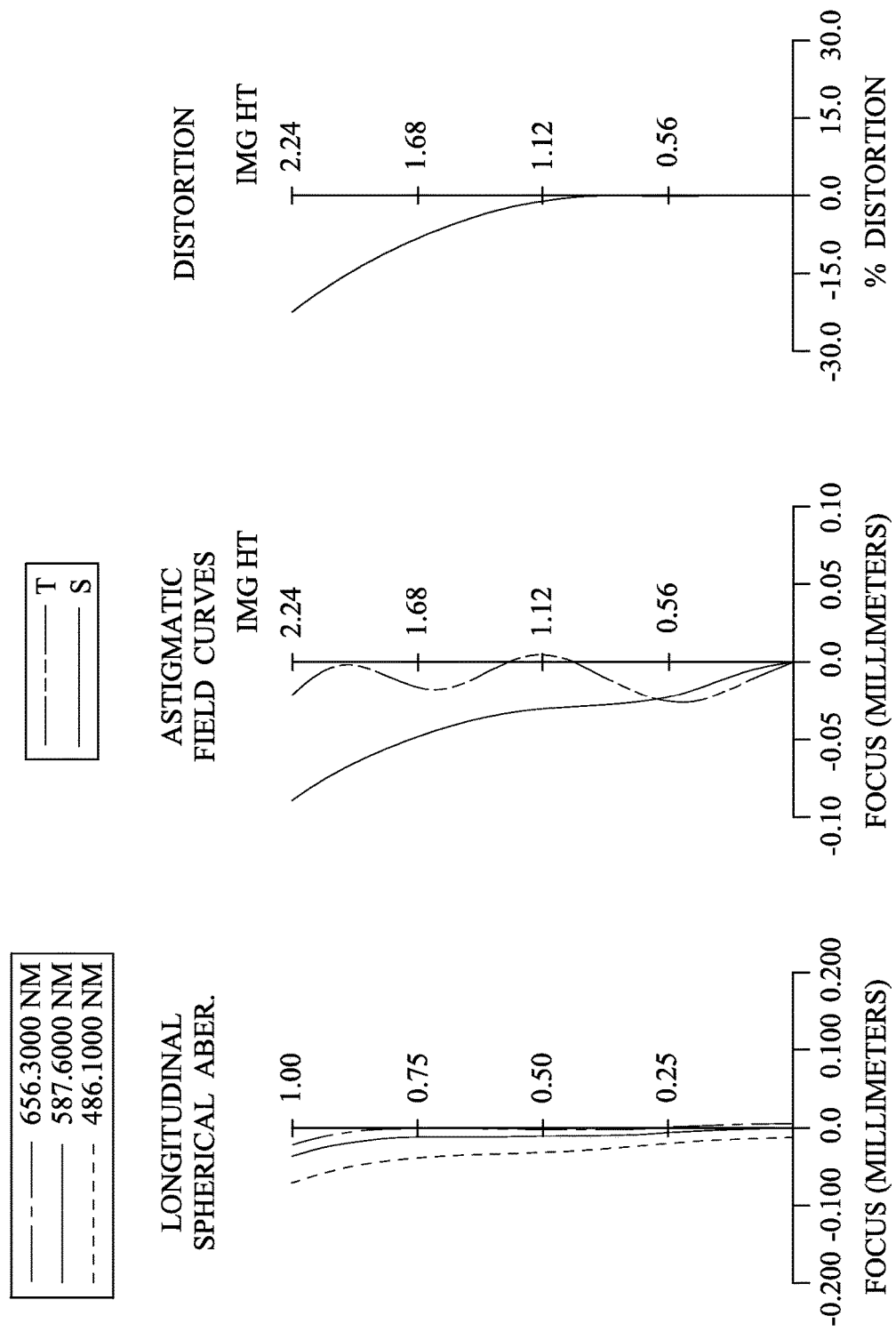
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes a photographing optical lens assembly (its reference numeral is omitted) and an image sensor 490. The photographing optical lens assembly includes, in order from an object side to an image side, a first lens element 410, a second lens element 420, a third lens element 430, an aperture stop 400, a fourth lens element 440, a fifth lens element 450, an IR-cut filter 460, a cover glass 470 and an image surface 480, wherein the image sensor 490 is disposed on the image surface 480 of the photographing optical lens assembly. The photographing optical lens assembly has a total of five lens elements (410-450). There is an air space in a paraxial region between every two of the first lens element 410, the second lens element 420, the third lens element 430, the fourth lens element 440 and the fifth lens element 450 that are adjacent to each other.

The first lens element 410 with negative refractive power has a convex object-side surface 411 and a concave image-side surface 412. The first lens element 410 is made of a glass material, and has the object-side surface 411 and the image-side surface 412 being both spherical.

The second lens element 420 with negative refractive power has a convex object-side surface 421 and a concave image-side surface 422. The second lens element 420 is made of a plastic material and has the object-side surface 421 and the image-side surface 422 being both aspheric.

The third lens element 430 with positive refractive power has a convex object-side surface 431 and a convex image-side surface 432. The third lens element 430 is made of a glass material, and has the object-side surface 431 and the image-side surface 432 being both spherical.

The fourth lens element 440 with positive refractive power has a convex object-side surface 441 and a convex image-side surface 442. The fourth lens element 440 is made of a plastic material, and has the object-side surface 441 and the image-side surface 442 being both aspheric.

The fifth lens element 450 with negative refractive power has a concave object-side surface 451 and a convex image-side surface 452. The fifth lens element 450 is made of a plastic material, and has the object-side surface 451 and the image-side surface 452 being both aspheric. Furthermore, the image-side surface 452 of the fifth lens element 450 includes at least one concave shape in an off-axial region thereof.

The IR-cut filter 460 is made of a glass material, the IR-cut filter 460 and the cover glass 470 are located between the fifth lens element 450 and the image surface 480 in order, and will not affect the focal length of the photographing optical lens assembly.

The detailed optical data of the 4th embodiment are shown in Table 7 and the aspheric surface data are shown in Table 8 below.

TABLE 7

4th Embodiment
f = 1.18 mm, Fno = 2.00, HFOV = 67.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 15.165 | | 0.650 | Glass | 1.804 | 46.5 | −5.70 |
| 2 | | 3.455 | | 1.600 | | | | |
| 3 | Lens 2 | 44.818 | ASP | 0.808 | Plastic | 1.535 | 55.7 | −4.13 |
| 4 | | 2.093 | ASP | 1.404 | | | | |
| 5 | Lens 3 | 4.757 | | 2.290 | Glass | 1.847 | 23.8 | 4.88 |
| 6 | | −24.672 | | 1.567 | | | | |
| 7 | Ape. Stop | Plano | | 0.532 | | | | |
| 8 | Lens 4 | 3.051 | ASP | 1.846 | Plastic | 1.535 | 55.7 | 1.17 |
| 9 | | −0.620 | ASP | 0.083 | | | | |
| 10 | Lens 5 | −0.543 | ASP | 0.759 | Plastic | 1.639 | 23.5 | −2.53 |
| 11 | | −1.264 | ASP | 0.200 | | | | |
| 12 | IR-cut filter | Plano | | 0.300 | Glass | 1.517 | 64.2 | — |
| 13 | | Plano | | 1.400 | | | | |
| 14 | Cover glass | Plano | | 0.400 | Glass | 1.517 | 64.2 | — |
| 15 | | Plano | | 0.040 | | | | |
| 16 | Image | Plano | | — | | | | |

Reference wavelength is 587.6 nm (d-line).

TABLE 8

Aspheric Coefficients

| | Surface # | | |
|---|---|---|---|
| | 3 | 4 | 8 |
| k = | 8.0788E+01 | −8.0490E−01 | 3.0102E+00 |
| A4 = | 2.9793E−02 | 2.8233E−02 | −4.5597E−02 |
| A6 = | −5.3789E−03 | 4.6267E−04 | 5.8568E−02 |
| A8 = | 7.2022E−04 | −2.3041E−03 | −1.2383E−01 |
| A10 = | −6.8789E−05 | 5.2975E−04 | 9.5018E−02 |
| A12 = | 3.9811E−06 | −5.7216E−05 | −3.3602E−02 |
| A14 = | −1.0470E−07 | 2.4418E−06 | 4.7714E−03 |

| | Surface # | | |
|---|---|---|---|
| | 9 | 10 | 11 |
| k = | −1.3166E+00 | −2.1759E+00 | −3.4655E+00 |
| A4 = | 7.4765E−01 | 3.0239E−01 | −9.9477E−03 |
| A6 = | −1.1134E+00 | −5.5753E−01 | −7.5211E−03 |
| A8 = | 8.2219E−01 | 3.6667E−01 | 7.3443E−03 |
| A10 = | −3.5091E−01 | −9.8251E−02 | 2.4898E−04 |
| A12 = | 8.4860E−02 | 9.4345E−03 | −3.5262E−04 |
| A14 = | −8.6098E−03 | | |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.18 | Sag12/T12 | 1.48 |
| Fno | 2.00 | (R5 + R6)/(R5 − R6) | −0.68 |
| HFOV [deg.] | 67.8 | |(R8 + R9)/(R8 − R9)| | 15.07 |
| FOV [deg.] | 135.6 | f/f4 | 1.01 |

-continued

| 4th Embodiment | | | |
|---|---|---|---|
| V3 | 23.8 | f3/f4 | 4.17 |
| T34/T12 | 1.31 | f/f123 | −0.07 |
| BL/Dr7r10 | 0.87 | (P4)/(|P1| + |P2| + |P3|) | 1.37 |
| ΣAT/Td | 0.45 | | |

Moreover, in the photographing optical lens assembly according to the 4th embodiment, when the axial distance between the first lens element 410 and the second lens element 420 is T12, the axial distance between the second lens element 420 and the third lens element 430 is T23, the axial distance between the third lens element 430 and the fourth lens element 440 is T34, and the axial distance between the fourth lens element 440 and the fifth lens element 450 is T45, the following conditions are satisfied: T12<T34; T23<T34; and T45<T34.

Furthermore, in the photographing optical lens assembly according to the 4th embodiment, when the focal length of the first lens element 410 is f1, the focal length of the second lens element 420 is f2, the focal length of the third lens element 430 is f3, the focal length of the fourth lens element 440 is f4, and a focal length of the fifth lens element 450 is f5, the following conditions are satisfied: |f4|<|f1|; |f4|<|f2|; |f4|<|f3|; and |f4|<|f5|.

5th Embodiment

Figure 9:
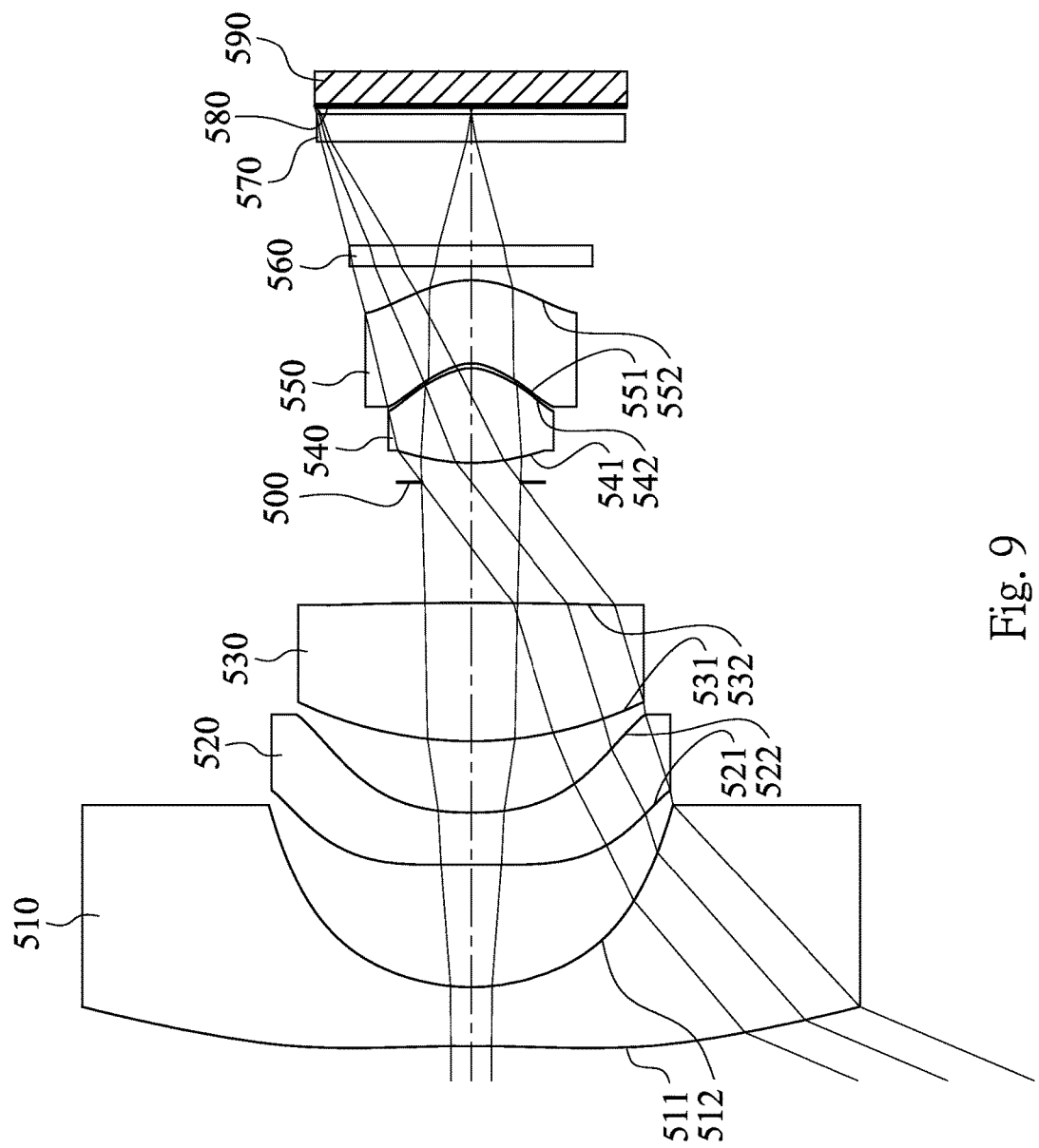
FIG. 9 is a schematic view of an image capturing device according to the 5th embodiment of the present disclosure.
Figure 10:
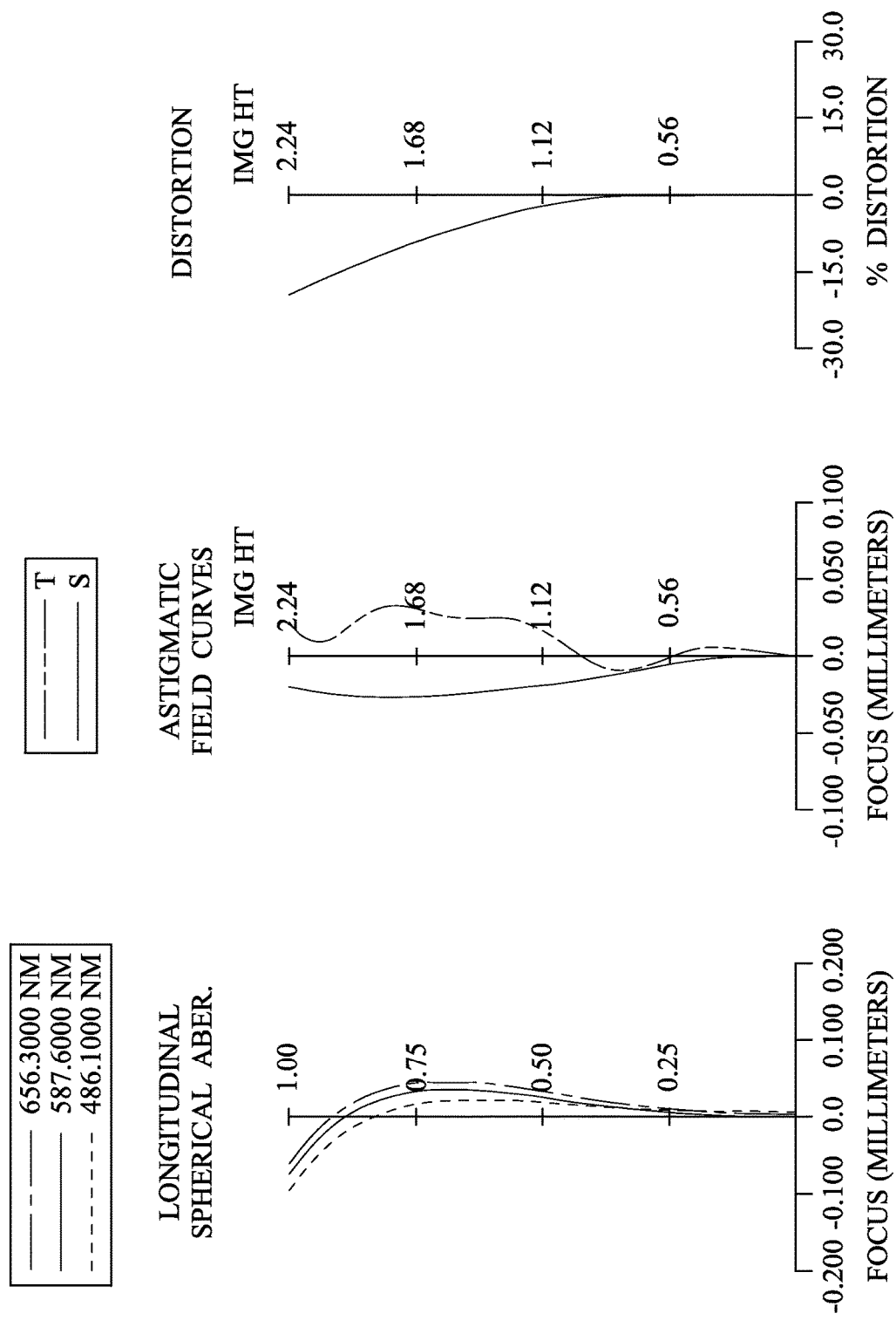
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes a photographing optical lens assembly (its reference numeral is omitted) and an image sensor 590. The photographing optical lens assembly includes, in order from an object side to an image side, a first lens element 510, a second lens element 520, a third lens element 530, an aperture stop 500, a fourth lens element 540, a fifth lens element 550, an IR-cut filter 560, a cover glass 570 and an image surface 580, wherein the image sensor 590 is disposed on the image surface 580 of the photographing optical lens assembly. The photographing optical lens assembly has a total of five lens elements (510-550). There is an air space in a paraxial region between every two of the first lens element 510, the second lens element 520, the third lens element 530, the fourth lens element 540 and the fifth lens element 550 that are adjacent to each other.

The first lens element 510 with negative refractive power has a concave object-side surface 511 and a concave image-side surface 512. The first lens element 510 is made of a glass material, and has the object-side surface 511 and the image-side surface 512 being both aspheric.

The second lens element 520 with negative refractive power has a concave object-side surface 521 and a concave image-side surface 522. The second lens element 520 is made of a plastic material and has the object-side surface 521 and the image-side surface 522 being both aspheric.

The third lens element 530 with positive refractive power has a convex object-side surface 531 and a convex image-side surface 532. The third lens element 530 is made of a glass material, and has the object-side surface 531 and the image-side surface 532 being both spherical.

The fourth lens element 540 with positive refractive power has a convex object-side surface 541 and a convex image-side surface 542. The fourth lens element 540 is made of a plastic material, and has the object-side surface 541 and the image-side surface 542 being both aspheric.

The fifth lens element 550 with negative refractive power has a concave object-side surface 551 and a convex image-side surface 552. The fifth lens element 550 is made of a plastic material, and has the object-side surface 551 and the image-side surface 552 being both aspheric. Furthermore, the image-side surface 552 of the fifth lens element 550 includes at least one concave shape in an off-axial region thereof.

The IR-cut filter 560 is made of a glass material, the IR-cut filter 560 and the cover glass 570 are located between the fifth lens element 550 and the image surface 580 in order, and will not affect the focal length of the photographing optical lens assembly.

The detailed optical data of the 5th embodiment are shown in Table 9 and the aspheric surface data are shown in Table 10 below.

TABLE 9

5th Embodiment
f = 1.18 mm, Fno = 2.00, HFOV = 67.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −21.419 | ASP | 0.850 | Glass | 1.693 | 53.2 | −3.85 |
| 2 | | 3.097 | ASP | 1.777 | | | | |
| 3 | Lens 2 | −28.787 | ASP | 0.750 | Plastic | 1.544 | 55.9 | −6.97 |
| 4 | | 4.410 | ASP | 1.032 | | | | |
| 5 | Lens 3 | 5.775 | | 1.998 | Glass | 2.005 | 21.0 | 5.38 |
| 6 | | −70.762 | | 1.753 | | | | |
| 7 | Ape. Stop | Plano | | 0.276 | | | | |
| 8 | Lens 4 | 2.827 | ASP | 1.368 | Plastic | 1.544 | 55.9 | 1.14 |
| 9 | | −0.659 | ASP | 0.070 | | | | |
| 10 | Lens 5 | −0.607 | ASP | 1.210 | Plastic | 1.650 | 21.4 | −3.29 |
| 11 | | −1.514 | ASP | 0.200 | | | | |
| 12 | IR-cut filter | Plano | | 0.300 | Glass | 1.517 | 64.2 | — |
| 13 | | Plano | | 1.500 | | | | |
| 14 | Cover glass | Plano | | 0.400 | Glass | 1.517 | 64.2 | — |
| 15 | | Plano | | 0.115 | | | | |
| 16 | Image | Plano | | — | | | | |

Reference wavelength is 587.6 nm (d-line).

TABLE 10

Aspheric Coefficients

| | Surface # | | | |
|---|---|---|---|---|
| | 1 | 2 | 3 | 4 |
| k = | −6.8965E+00 | −3.8181E−02 | 9.6296E+01 | 3.4908E−01 |
| A4 = | 5.0331E−03 | −1.0082E−03 | 3.2125E−02 | 3.7722E−02 |
| A6 = | −2.9086E−04 | 4.8984E−04 | −3.8353E−03 | −3.9360E−03 |
| A8 = | 9.1817E−06 | 2.1240E−04 | 7.1497E−04 | 5.2396E−04 |
| A10 = | −1.4470E−07 | −1.5650E−05 | −8.0219E−05 | −1.0205E−04 |
| A12 = | 5.5200E−10 | −2.6261E−15 | 4.2107E−06 | 2.7672E−06 |
| A14 = | 7.8978E−12 | −6.0430E−18 | −1.1410E−07 | 2.4571E−07 |

| | Surface # | | | |
|---|---|---|---|---|
| | 8 | 9 | 10 | 11 |
| k = | 3.1582E+00 | −1.0342E+00 | −2.0803E+00 | −1.1574E+00 |
| A4 = | −5.0538E−02 | 7.8537E−01 | 2.8765E−01 | 5.6884E−02 |
| A6 = | 4.4260E−02 | −1.0611E+00 | −5.4033E−01 | −1.8562E−02 |
| A8 = | −1.2550E−01 | 7.7826E−01 | 3.9076E−01 | 9.4644E−03 |

TABLE 10-continued

| Aspheric Coefficients | | | | |
|---|---|---|---|---|
| A10 = | 1.3139E−01 | −3.2522E−01 | −1.0562E−01 | −9.7985E−04 |
| A12 = | −5.9690E−02 | 8.4860E−02 | 9.4345E−03 | −1.3137E−04 |
| A14 = | 9.9193E−03 | −8.6098E−03 | | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.18 | Sag12/T12 | 1.48 |
| Fno | 2.00 | (R5 + R6)/(R5 − R6) | −0.85 |
| HFOV [deg.] | 67.0 | \|(R8 + R9)/(R8 − R9)\| | 24.46 |
| FOV [deg.] | 134.0 | f/f4 | 1.04 |
| V3 | 21.0 | f3/f4 | 4.72 |
| T34/T12 | 1.14 | f/f123 | −0.10 |
| BL/Dr7r10 | 0.95 | (P4)/(\|P1\| + \|P2\| + \|P3\|) | 1.49 |
| ΣAT/Td | 0.44 | | |

Moreover, in the photographing optical lens assembly according to the 5th embodiment, when the axial distance between the first lens element 510 and the second lens element 520 is T12, the axial distance between the second lens element 520 and the third lens element 530 is T23, the axial distance between the third lens element 530 and the fourth lens element 540 is T34, and the axial distance between the fourth lens element 540 and the fifth lens element 550 is T45, the following conditions are satisfied: T12<T34; T23<T34; and T45<T34.

Furthermore, in the photographing optical lens assembly according to the 5th embodiment, when the focal length of the first lens element 510 is f1, the focal length of the second lens element 520 is f2, the focal length of the third lens element 530 is f3, the focal length of the fourth lens element 540 is f4, and a focal length of the fifth lens element 550 is f5, the following conditions are satisfied: |f4|<|f1|; |f4|<|f2|; |f4|<|f3|; and |f4|<|f5|.

6th Embodiment

Figure 11:
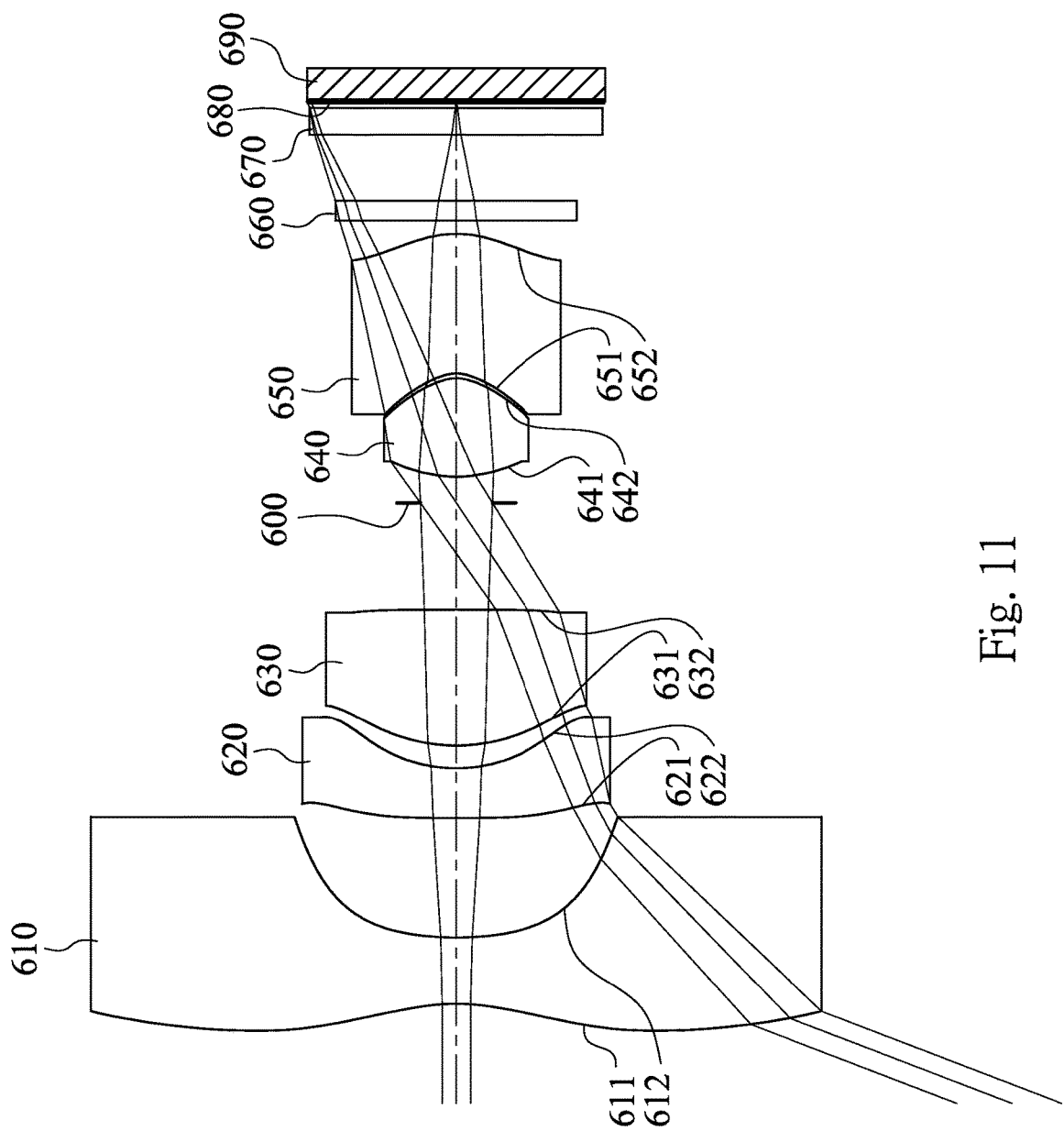
FIG. 11 is a schematic view of an image capturing device according to the 6th embodiment of the present disclosure.
Figure 12:
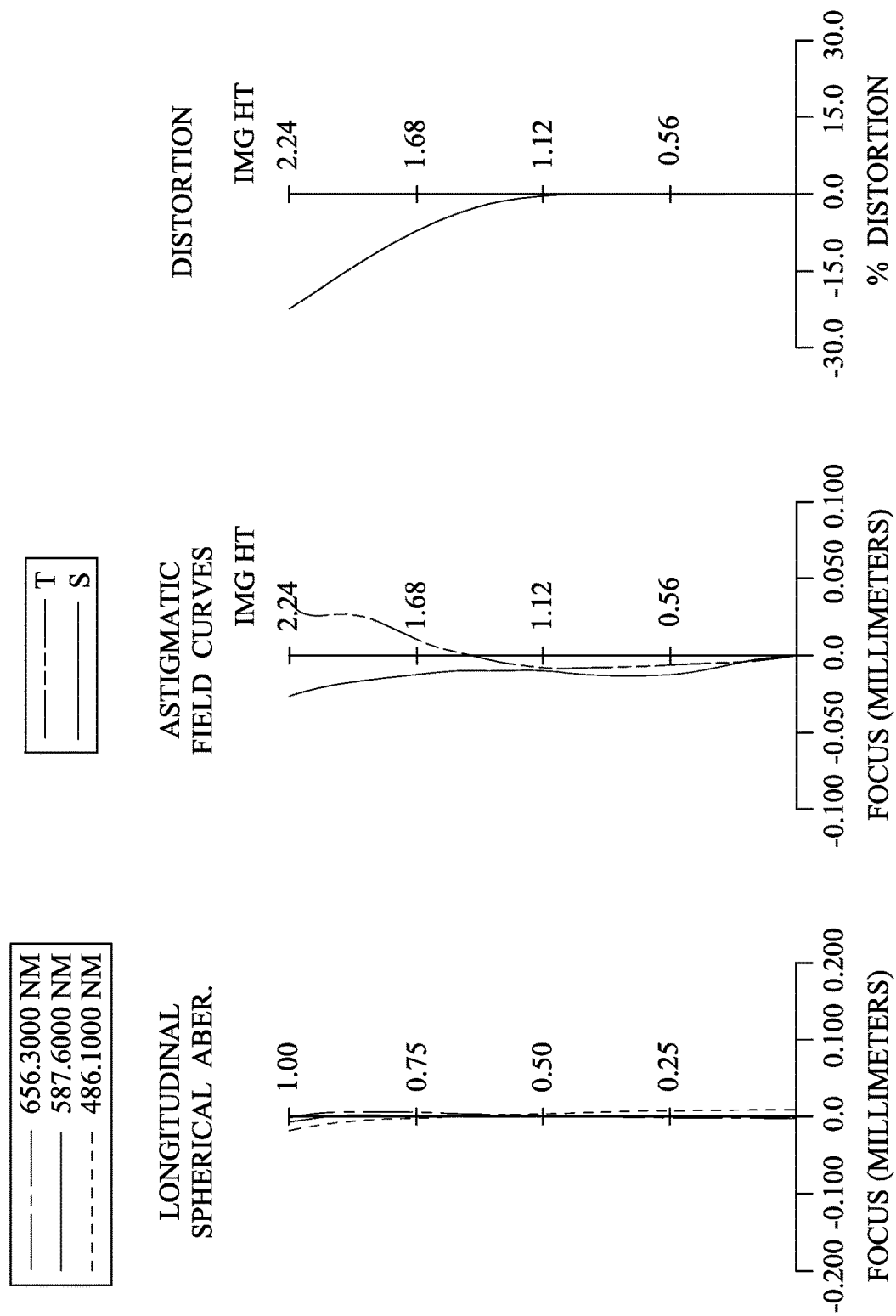
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes a photographing optical lens assembly (its reference numeral is omitted) and an image sensor 690. The photographing optical lens assembly includes, in order from an object side to an image side, a first lens element 610, a second lens element 620, a third lens element 630, an aperture stop 600, a fourth lens element 640, a fifth lens element 650, an IR-cut filter 660, a cover glass 670 and an image surface 680, wherein the image sensor 690 is disposed on the image surface 680 of the photographing optical lens assembly. The photographing optical lens assembly has a total of five lens elements (610-650). There is an air space in a paraxial region between every two of the first lens element 610, the second lens element 620, the third lens element 630, the fourth lens element 640 and the fifth lens element 650 that are adjacent to each other.

The first lens element 610 with negative refractive power has a concave object-side surface 611 and a concave image-side surface 612. The first lens element 610 is made of a plastic material, and has the object-side surface 611 and the image-side surface 612 being both aspheric.

The second lens element 620 with negative refractive power has a convex object-side surface 621 and a concave image-side surface 622. The second lens element 620 is made of a plastic material and has the object-side surface 621 and the image-side surface 622 being both aspheric.

The third lens element 630 with positive refractive power has a convex object-side surface 631 and a planar image-side surface 632. The third lens element 630 is made of a plastic material, and has the object-side surface 631 and the image-side surface 632 being both aspheric.

The fourth lens element 640 with positive refractive power has a convex object-side surface 641 and a convex image-side surface 642. The fourth lens element 640 is made of a plastic material, and has the object-side surface 641 and the image-side surface 642 being both aspheric.

The fifth lens element 650 with negative refractive power has a concave object-side surface 651 and a convex image-side surface 652. The fifth lens element 650 is made of a plastic material, and has the object-side surface 651 and the image-side surface 652 being both aspheric. Furthermore, the image-side surface 652 of the fifth lens element 650 includes at least one concave shape in an off-axial region thereof.

The IR-cut filter 660 is made of a glass material, the IR-cut filter 660 and the cover glass 670 are located between the fifth lens element 650 and the image surface 680 in order, and will not affect the focal length of the photographing optical lens assembly.

The detailed optical data of the 6th embodiment are shown in Table 11 and the aspheric surface data are shown in Table 12 below.

TABLE 11

6th Embodiment
f = 1.11 mm, Fno = 2.60, HFOV = 69.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.171 | ASP | 1.000 | Plastic | 1.544 | 55.9 | −3.38 |

TABLE 11-continued

6th Embodiment
f = 1.11 mm, Fno = 2.60, HFOV = 69.0 deg.

| Surface # | | Curvature Radius | | Thickness | Material | Index | Abbe # | Focal Length |
|---|---|---|---|---|---|---|---|---|
| 2 | | 4.882 | ASP | 1.799 | | | | |
| 3 | Lens 2 | 71.873 | ASP | 0.750 | Plastic | 1.544 | 55.9 | −4.82 |
| 4 | | 2.519 | ASP | 0.340 | | | | |
| 5 | Lens 3 | 2.655 | ASP | 2.053 | Plastic | 1.639 | 23.5 | 4.16 |
| 6 | | ∞ | ASP | 1.604 | | | | |
| 7 | Ape. Stop | Plano | | 0.394 | | | | |
| 8 | Lens 4 | 2.034 | ASP | 1.491 | Plastic | 1.544 | 55.9 | 1.10 |
| 9 | | −0.626 | ASP | 0.070 | | | | |
| 10 | Lens 5 | −0.602 | ASP | 2.099 | Plastic | 1.639 | 23.5 | −7.17 |
| 11 | | −1.636 | ASP | 0.200 | | | | |
| 12 | IR-cut filter | Plano | | 0.300 | Glass | 1.517 | 64.2 | — |
| 13 | | Plano | | 1.000 | | | | |
| 14 | Cover glass | Plano | | 0.400 | Glass | 1.517 | 64.2 | — |
| 15 | | Plano | | 0.100 | | | | |
| 16 | Image | Plano | | — | | | | |

Reference wavelength is 587.6 nm (d-line).

TABLE 12

Aspheric Coefficients

| Surface # | | | | | |
|---|---|---|---|---|---|
| | 1 | 2 | 3 | 4 | 5 |
| k = | −8.2535E+00 | 9.0671E−01 | 9.9000E+01 | 2.8357E−01 | 4.1445E−03 |
| A4 = | 7.8093E−03 | 1.9433E−02 | 2.1788E−02 | 3.2803E−02 | 2.2499E−03 |
| A6 = | −5.4449E−04 | −2.0406E−03 | −3.4258E−03 | −9.6810E−03 | −1.6875E−03 |
| A8 = | 2.1659E−05 | 1.2942E−03 | 5.6928E−04 | −2.4689E−04 | −6.3140E−04 |
| A10 = | −5.1790E−07 | −1.0085E−04 | −1.0204E−04 | −1.8110E−04 | −6.8121E−05 |
| A12 = | 7.1042E−09 | 1.6085E−08 | 3.1202E−06 | 2.7672E−06 | 8.1337E−16 |
| A14 = | −4.3031E−11 | −7.0171E−18 | −1.1498E−07 | 2.4571E−07 | −2.4579E−18 |

| Surface # | | | | |
|---|---|---|---|---|
| | 6 | 8 | 9 | 10 | 11 |
| k = | 0.0000E+00 | 1.3701E+00 | −1.0401E+00 | −1.7800E+00 | −1.0931E+00 |
| A4 = | −9.9334E−04 | −5.3855E−02 | 7.8459E−01 | 4.0965E−01 | 5.0655E−02 |
| A6 = | −3.3648E−03 | 5.3107E−02 | −9.1640E−01 | −5.9770E−01 | 1.5957E−02 |
| A8 = | −7.6851E−04 | −2.0335E−01 | 5.0887E−01 | 2.4072E−01 | −1.4433E−02 |
| A10 = | 4.2297E−04 | 2.9135E−01 | −2.0484E−01 | 2.8318E−02 | 5.2743E−03 |
| A12 = | −3.0217E−16 | −1.8291E−01 | 1.2569E−01 | −2.3096E−02 | −6.9639E−04 |
| A14 = | −6.7564E−18 | 3.8463E−02 | −4.0272E−02 | | |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.11 | Sag12/T12 | 1.01 |
| Fno | 2.60 | (R5 + R6)/(R5 − R6) | −1.00 |
| HFOV [deg.] | 69.0 | |(R8 + R9)/(R8 − R9)| | 51.51 |
| FOV [deg.] | 138.0 | f/f4 | 1.01 |
| V3 | 23.5 | f3/f4 | 3.78 |
| T34/T12 | 1.11 | f/f123 | −0.20 |
| BL/Dr7r10 | 0.55 | (P4)/(|P1| + |P2| + |P3|) | 1.22 |
| ΣAT/Td | 0.36 | | |

Moreover, in the photographing optical lens assembly according to the 6th embodiment, when the axial distance between the first lens element 610 and the second lens element 620 is T12, the axial distance between the second lens element 620 and the third lens element 630 is T23, the axial distance between the third lens element 630 and the fourth lens element 640 is T34, and the axial distance between the fourth lens element 640 and the fifth lens element 650 is T45, the following conditions are satisfied: T12<T34; T23<T34; and T45<T34.

Furthermore, in the photographing optical lens assembly according to the 6th embodiment, when the focal length of the first lens element 610 is f1, the focal length of the second lens element 620 is f2, the focal length of the third lens element 630 is f3, the focal length of the fourth lens element 640 is f 4 , and a focal length of the fifth lens element 650 is f5, the following conditions are satisfied: |f4|<|f1|; |f4|<|f2|; |f4|<|f3|; and |f4|<|f5|.

7th Embodiment

Figure 13:
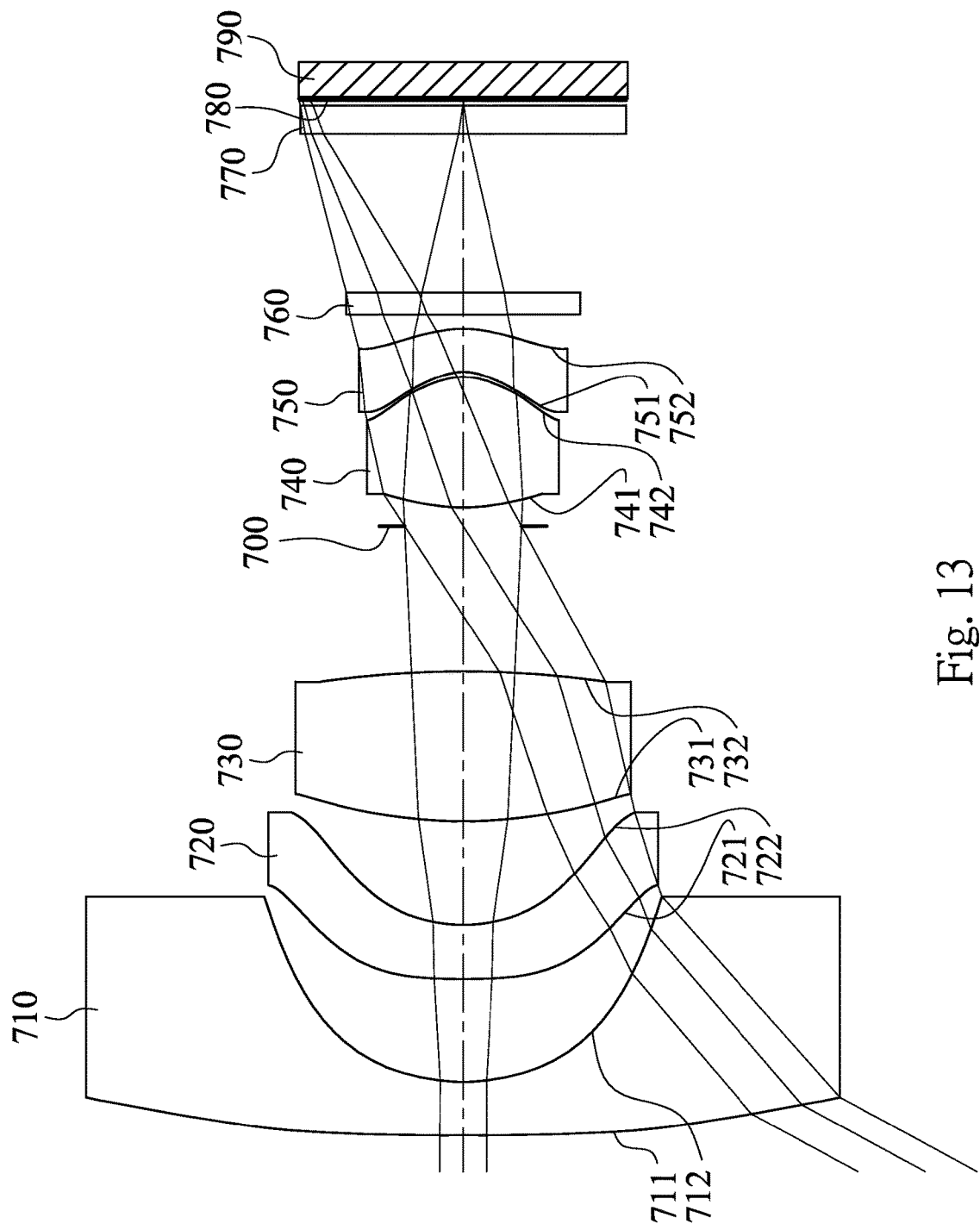
FIG. 13 is a schematic view of an image capturing device according to the 7th embodiment of the present disclosure.
Figure 14:
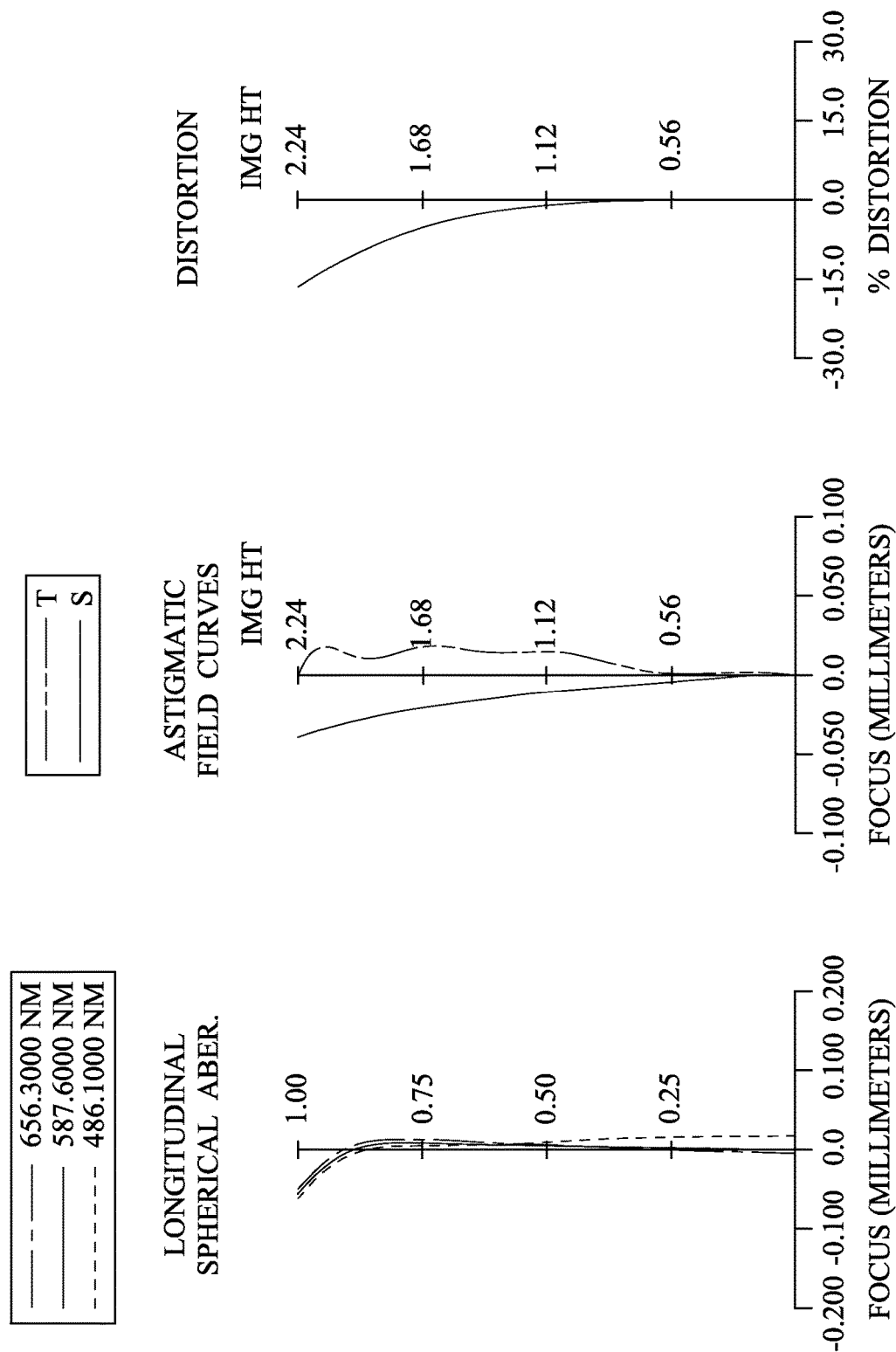
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes a photographing optical lens assembly (its reference numeral is omitted) and an image sensor 790. The photographing optical lens assembly includes, in order from an object side to an image side, a first lens element 710, a second lens element 720, a third lens element 730, an aperture stop 700, a fourth lens element 740, a fifth lens element 750, an IR-cut filter 760, a cover glass 770 and an image surface 780, wherein the image sensor 790 is disposed on the image surface 780 of the photographing optical lens assembly. The photographing optical lens assembly has a total of five lens elements (710-750). There is an air space in a paraxial region between every two of the first lens element 710, the second lens element 720, the third lens element 730, the fourth lens element 740 and the fifth lens element 750 that are adjacent to each other.

The first lens element 710 with negative refractive power has a convex object-side surface 711 and a concave image-side surface 712. The first lens element 710 is made of a plastic material, and has the object-side surface 711 and the image-side surface 712 being both aspheric.

The second lens element 720 with negative refractive power has a convex object-side surface 721 and a concave image-side surface 722. The second lens element 720 is made of a plastic material and has the object-side surface 721 and the image-side surface 722 being both aspheric.

The third lens element 730 with positive refractive power has a convex object-side surface 731 and a convex image-side surface 732. The third lens element 730 is made of a plastic material, and has the object-side surface 731 and the image-side surface 732 being both aspheric.

The fourth lens element 740 with positive refractive power has a convex object-side surface 741 and a convex image-side surface 742. The fourth lens element 740 is made of a plastic material, and has the object-side surface 741 and the image-side surface 742 being both aspheric.

The fifth lens element 750 with negative refractive power has a concave object-side surface 751 and a convex image-side surface 752. The fifth lens element 750 is made of a plastic material, and has the object-side surface 751 and the image-side surface 752 being both aspheric. Furthermore, the image-side surface 752 of the fifth lens element 750 includes at least one concave shape in an off-axial region thereof.

The IR-cut filter 760 is made of a glass material, the IR-cut filter 760 and the cover glass 770 are located between the fifth lens element 750 and the image surface 780 in order, and will not affect the focal length of the photographing optical lens assembly.

The detailed optical data of the 7th embodiment are shown in Table 13 and the aspheric surface data are shown in Table 14 below.

TABLE 13

7th Embodiment
f = 1.46 mm, Fno = 2.25, HFOV = 61.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 45.012 | ASP | 0.750 | Plastic | 1.544 | 55.9 | −5.83 |
| 2 | | 2.948 | ASP | 1.425 | | | | |
| 3 | Lens 2 | 11.481 | ASP | 0.750 | Plastic | 1.544 | 55.9 | −5.28 |
| 4 | | 2.246 | ASP | 1.443 | | | | |
| 5 | Lens 3 | 6.057 | ASP | 2.075 | Plastic | 1.639 | 23.5 | 6.99 |
| 6 | | −14.725 | ASP | 2.020 | | | | |
| 7 | Ape. Stop | Plano | | 0.259 | | | | |
| 8 | Lens 4 | 2.916 | ASP | 1.814 | Plastic | 1.544 | 55.9 | 1.45 |
| 9 | | −0.848 | ASP | 0.070 | | | | |
| 10 | Lens 5 | −0.725 | ASP | 0.600 | Plastic | 1.661 | 20.4 | −2.63 |
| 11 | | −1.656 | ASP | 0.200 | | | | |
| 12 | IR-cut filter | Plano | | 0.300 | Glass | 1.517 | 64.2 | — |
| 13 | | Plano | | 2.200 | | | | |
| 14 | Cover glass | Plano | | 0.400 | Glass | 1.517 | 64.2 | — |
| 15 | | Plano | | 0.093 | | | | |
| 16 | Image | Plano | | — | | | | |

Reference wavelength is 587.6 nm (d-line).

TABLE 14

Aspheric Coefficients

| | Surface # | | | | |
|---|---|---|---|---|---|
| | 1 | 2 | 3 | 4 | 5 |
| k = | 1.0922E+01 | −5.3938E−01 | 1.1327E+01 | −1.0856E+00 | −3.0232E+01 |
| A4 = | −9.3755E−04 | 6.7000E−03 | 4.0570E−02 | 2.4239E−02 | 2.6353E−03 |

TABLE 14-continued

| Aspheric Coefficients | | | | | |
|---|---|---|---|---|---|
| A6 = | 4.2075E−04 | −3.9319E−04 | −2.0025E−03 | 1.7437E−02 | 1.1907E−03 |
| A8 = | −4.7302E−05 | 1.2153E−03 | −2.3323E−04 | −1.0405E−02 | −1.0170E−04 |
| A10 = | 2.7579E−06 | −2.5453E−04 | 1.7232E−05 | 2.6740E−03 | −1.5161E−05 |
| A12 = | −9.2665E−08 | 2.0383E−05 | 1.2283E−06 | −3.8185E−04 | −1.8044E−15 |
| A14 = | 1.7027E−09 | 1.1922E−07 | −3.3347E−07 | 2.2001E−05 | −1.7810E−17 |
| A16 = | −1.3201E−11 | −7.2438E−08 | | | |

| | Surface # | | | | |
|---|---|---|---|---|---|
| | 6 | 8 | 9 | 10 | 11 |
| k = | 4.5733E+01 | 2.2146E+00 | −7.0425E−01 | −2.8925E+00 | −6.7891E+00 |
| A4 = | −2.4871E−03 | −2.9507E−02 | 6.7206E−01 | 2.0692E−01 | 7.7159E−03 |
| A6 = | 2.8997E−03 | 4.8311E−02 | −9.2460E−01 | −4.6282E−01 | −2.0293E−03 |
| A8 = | −3.3046E−05 | −1.6544E−01 | 7.6961E−01 | 3.5527E−01 | 5.2691E−03 |
| A10 = | −5.5055E−04 | 2.2343E−01 | −3.3992E−01 | −1.0147E−01 | −7.5294E−04 |
| A12 = | 1.9331E−04 | −1.4577E−01 | 8.4860E−02 | 9.4345E−03 | 2.0056E−04 |
| A14 = | −1.9143E−05 | 3.7044E−02 | −8.6098E−03 | | |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.46 | Sag12/T12 | 1.80 |
| Fno | 2.25 | (R5 + R6)/(R5 − R6) | −0.42 |
| HFOV [deg.] | 61.4 | |(R8 + R9)/(R8 − R9)| | 12.88 |
| FOV [deg.] | 122.8 | f/f4 | 1.01 |
| V3 | 23.5 | f3/f4 | 4.82 |
| T34/T12 | 1.60 | f/f123 | −0.19 |
| BL/Dr7r10 | 1.29 | (P4)/(|P1| + |P2|+ |P3|) | 1.37 |
| ΣAT/Td | 0.47 | | |

Moreover, in the photographing optical lens assembly according to the 7th embodiment, when the axial distance between the first lens element 710 and the second lens element 720 is T12, the axial distance between the second lens element 720 and the third lens element 730 is T23, the axial distance between the third lens element 730 and the fourth lens element 740 is T34, and the axial distance between the fourth lens element 740 and the fifth lens element 750 is T45, the following conditions are satisfied: T12<T34; T23<T34; and T45<T34.

Furthermore, in the photographing optical lens assembly according to the 7th embodiment, when the focal length of the first lens element 710 is f1, the focal length of the second lens element 720 is f2, the focal length of the third lens element 730 is f3, the focal length of the fourth lens element 740 is f4, and a focal length of the fifth lens element 750 is f5, the following conditions are satisfied: |f4|<|f1|; |f4|<|f2|; |f4|<|f3|; and |f4|<|f5|.

8th Embodiment

Figure 17:
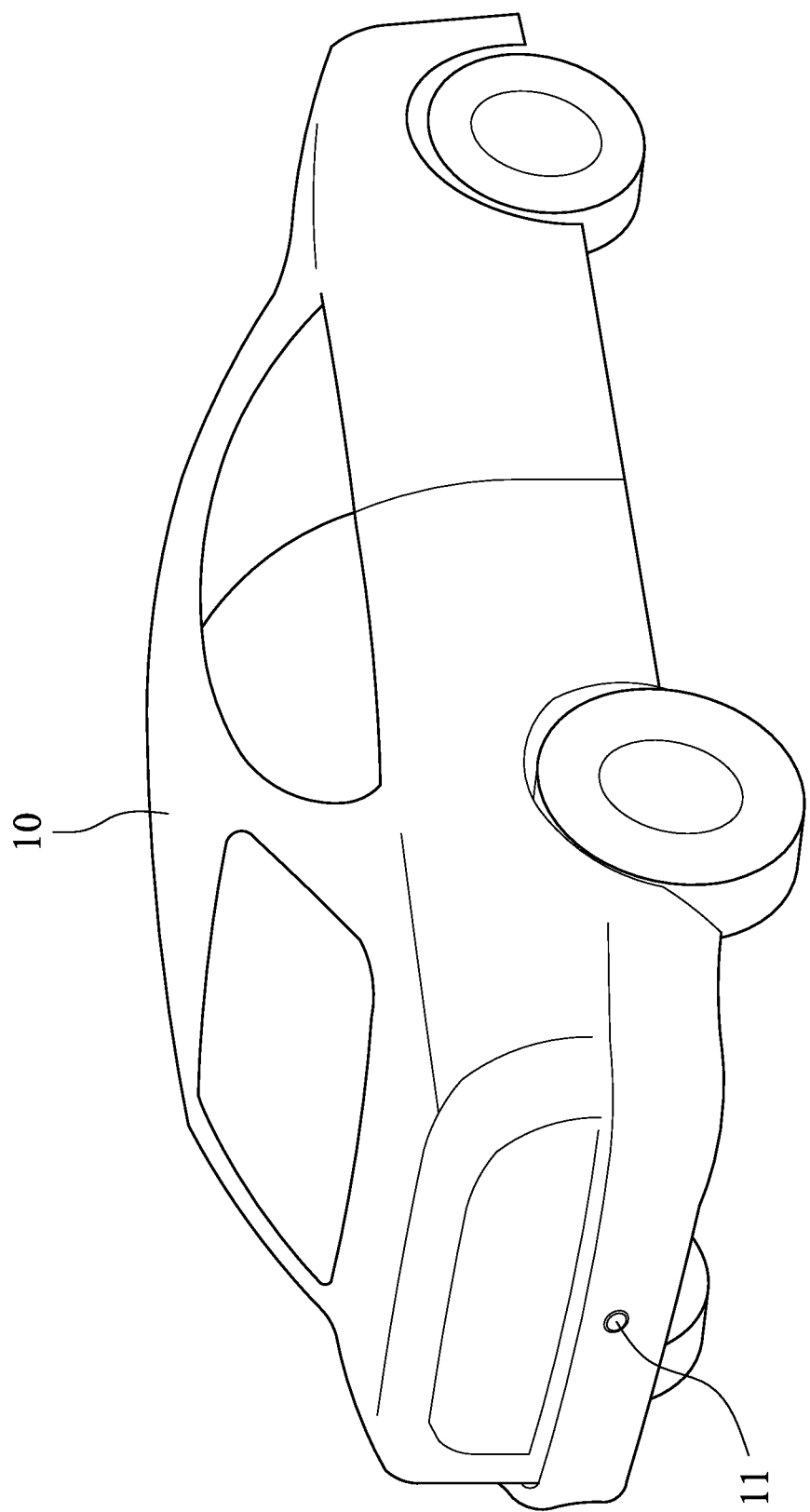
FIG. 17 is a schematic view of an electronic device according to the 8th embodiment of the present disclosure.

FIG. 17 is a schematic view of an electronic device 10 according to the 8th embodiment of the present disclosure. The electronic device 10 of the 8th embodiment is a rear-view camera system, wherein the electronic device 10 includes an image capturing device 11. The image capturing device 11 includes a photographing optical lens assembly (its reference numeral is omitted) according to the present disclosure and an image sensor (its reference numeral is omitted), wherein the image sensor is disposed on an image surface of the photographing optical lens assembly.

9th Embodiment

Figure 18:
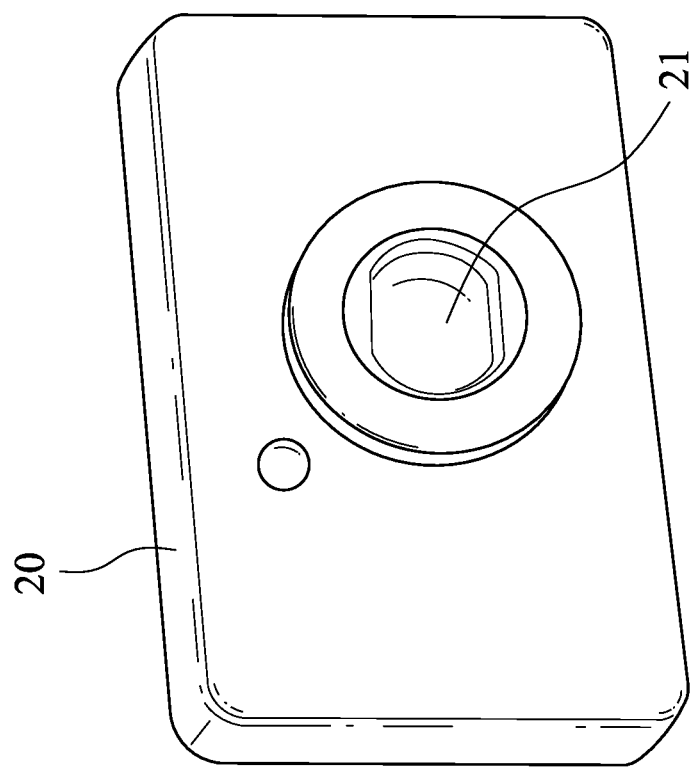
FIG. 18 is a schematic view of an electronic device according to the 9th embodiment of the present disclosure.

FIG. 18 is a schematic view of an electronic device 20 according to the 9th embodiment of the present disclosure. The electronic device 20 of the 9th embodiment is a driving recording system, wherein the electronic device 20 includes an image capturing device 21. The image capturing device 21 includes a photographing optical lens assembly (its reference numeral is omitted) according to the present disclosure and an image sensor (its reference numeral is omitted), wherein the image sensor is disposed on an image surface of the photographing optical lens assembly.

10th Embodiment

FIG. 19 is a schematic view of an electronic device 30 according to the 10th embodiment of the present disclosure. The electronic device 30 of the 10th embodiment is a surveillance system, wherein the electronic device 30 includes an image capturing device 31. The image capturing device 31 includes a photographing optical lens assembly (its reference numeral is omitted) according to the present disclosure and an image sensor (its reference numeral is omitted), wherein the image sensor is disposed on an image surface of the photographing optical lens assembly.

The foregoing description, for purpose of explanation, has been described with reference to specific embodiments. It is to be noted that Tables 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising, in order from an object side to an image side:
   a first lens element with negative refractive power having a concave image-side surface;
   a second lens element with negative refractive power having a concave image-side surface;
   a third lens element having positive refractive power;
   a fourth lens element with positive refractive power having a convex image-side surface, wherein an object-side surface and the image-side surface of the fourth lens element are both aspheric; and
   a fifth lens element with negative refractive power having a concave object-side surface and a convex image-side surface, wherein the object-side surface and the image-side surface of the fifth lens element are both aspheric;
   wherein the photographing optical lens assembly has a total of five lens elements, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the photographing optical lens assembly is f, a focal length of the third lens element is f3, a focal length of the fourth lens element is f4, a refractive power of the first lens element is P1, a refractive power of the second lens element is P2, a refractive power of the third lens element is P3, a refractive power of the fourth lens element is P4, and the following conditions are satisfied:

$T12 < T34;$ $T23 < T34;$ $T45 < T34;$ $0.65 < f/f4;$ $1.0 < f3/f4;$ and $1.0 < (P4)/(|P1|+|P2|+|P3|) < 2.0.$ 2. The photographing optical lens assembly of claim 1, further comprising:
   a stop disposed between the third lens element and the fourth lens element.

3. The photographing optical lens assembly of claim 1, wherein at least one of the first lens element, the second lens element and the third lens element is made of a glass material, and at least one of an object-side surface and an image-side surface of the first lens element, the second lens element and the third lens element is spherical.

4. The photographing optical lens assembly of claim 1, wherein a focal length of the first lens element is f1, a focal length of the second lens element is f2, the focal length of the third lens element is f3, the focal length of the fourth lens element is f4, a focal length of the fifth lens element is f5, and the following conditions are satisfied:

$|f4| < |f1|;$ $|f4| < |f2|;$ $|f4| < |f3|;$ and $|f4| < |f5|.$

5. The photographing optical lens assembly of claim 1, wherein an axial distance between the image-side surface of the fifth lens element and an image surface is BL, an axial distance between the object-side surface of the fourth lens element and the image-side surface of the fifth lens element is Dr7r10, and the following condition is satisfied:

$0.40 < BL/Dr7r10 < 1.75.$

6. The photographing optical lens assembly of claim 1, wherein a curvature radius of an object-side surface of the third lens element is R5, a curvature radius of an image-side surface of the third lens element is R6, and the following condition is satisfied:

$-2.0 < (R5+R6)/(R5-R6) < -0.25.$

7. The photographing optical lens assembly of claim 1, wherein the focal length of the photographing optical lens assembly is f, a composite focal length of the first lens element, the second lens element and the third lens element is f123, and the following condition is satisfied:

$-0.50 < f/f123 < 0.$

8. The photographing optical lens assembly of claim 1, wherein an Abbe number of the third lens element is V3, and the following condition is satisfied:

$V3 < 30.$

9. The photographing optical lens assembly of claim 1, wherein there is an air space between every two lens elements of the first lens element, the second lens element, the third lens element, the fourth lens element and the fifth lens element that are adjacent to each other.

10. The photographing optical lens assembly of claim 9, wherein the first lens element has a convex object-side surface, a maximal field of view of the photographing optical lens assembly is FOV, and the following condition is satisfied:

$110 \text{degrees} \leq FOV \leq 200 \text{degrees}.$

11. The photographing optical lens assembly of claim 9, wherein a sum of axial distances between each two of the first lens element, the second lens element, the third lens element, the fourth lens element and the fifth lens element that are adjacent to each other is ΣAT, an axial distance between an object-side surface of the first lens element and the image-side surface of the fifth lens element is Td, and the following condition is satisfied:

$\Sigma AT/Td < 0.50.$

12. The photographing optical lens assembly of claim 9, wherein the object-side surface of the fourth lens element is convex.

13. The photographing optical lens assembly of claim 1, wherein the image-side surface of the fifth lens element comprises at least one concave shape in an off-axial region thereof.

14. The photographing optical lens assembly of claim 1, wherein the focal length of the photographing optical lens assembly is f, the focal length of the fourth lens element is f4, and the following condition is satisfied:

$0.80 < f/f4 < 2.0.$

15. The photographing optical lens assembly of claim 1, wherein a curvature radius of the image-side surface of the fourth lens element is R8, a curvature radius of the object-side surface of the fifth lens element is R9, and the following condition is satisfied:

$|(R8+R9)/(R8-R9)| < 100.$

16. The photographing optical lens assembly of claim 1, wherein the axial distance between the first lens element and the second lens element is T12, the axial distance between the third lens element and the fourth lens element is T34, and the following condition is satisfied:

$$1.05 < T34/T12 < 2.5.$$

17. The photographing optical lens assembly of claim 1, wherein the axial distance between the first lens element and the second lens element is T12, a distance in parallel with an optical axis from an axial vertex on the image-side surface of the first lens element to a maximum effective radius position on the image-side surface of the first lens element is Sag12, and the following condition is satisfied:

$$1.0 < Sag12/T12 < 2.0.$$

18. An image capturing device, comprising:
the photographing optical lens assembly of claim 1; and
an image sensor, wherein the image sensor is disposed on an image surface of the photographing optical lens assembly.

19. An electronic device, comprising:
the image capturing device of claim 18.

20. A photographing optical lens assembly comprising, in order from an object side to an image side:
a first lens element with negative refractive power having a concave image-side surface;
a second lens element with negative refractive power having a concave image-side surface;
a third lens element having positive refractive power;
a fourth lens element with positive refractive power having a convex image-side surface, wherein an object-side surface and the image-side surface of the fourth lens element are both aspheric; and
a fifth lens element with negative refractive power having a concave object-side surface and a convex image-side surface, wherein the object-side surface and the image-side surface of the fifth lens element are both aspheric;
wherein the photographing optical lens assembly has a total of five lens elements, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the photographing optical lens assembly is f, a focal length of the third lens element is f3, a focal length of the fourth lens element is f4, a curvature radius of an object-side surface of the third lens element is R5, a curvature radius of an image-side surface of the third lens element is R6, and the following conditions are satisfied:

$$T12 < T34;$$

$$T23 < T34;$$

$$T45 < T34;$$

$$0.65 < f/f4;$$

$$1.0 \le f3/f4; \text{ and}$$

$$-2.0 < (R5+R6)/(R5-R6) < -0.25.$$

21. The photographing optical lens assembly of claim 20, further comprising:
a stop disposed between the third lens element and the fourth lens element.

22. The photographing optical lens assembly of claim 20, wherein at least one of the first lens element, the second lens element and the third lens element is made of a glass material, and at least one of an object-side surface and an image-side surface of the first lens element, the second lens element and the third lens element is spherical.

23. The photographing optical lens assembly of claim 20, wherein a focal length of the first lens element is f1, a focal length of the second lens element is f2, the focal length of the third lens element is f3, the focal length of the fourth lens element is f4, a focal length of the fifth lens element is f5, and the following conditions are satisfied:

$$|f4| < |f1|;$$

$$|f4| < |f2|;$$

$$|f4| < |f3|; \text{ and}$$

$$|f4| < |f5|.$$

24. The photographing optical lens assembly of claim 20, wherein an axial distance between the image-side surface of the fifth lens element and an image surface is BL, an axial distance between the object-side surface of the fourth lens element and the image-side surface of the fifth lens element is Dr7r10, and the following condition is satisfied:

$$0.40 < BL/Dr7r10 < 1.75.$$

25. The photographing optical lens assembly of claim 20, wherein the focal length of the photographing optical lens assembly is f, a composite focal length of the first lens element, the second lens element and the third lens element is f123, and the following condition is satisfied:

$$-0.50 < f/f123 < 0.$$

26. The photographing optical lens assembly of claim 20, wherein an Abbe number of the third lens element is V3, and the following condition is satisfied:

$$V3 < 30.$$

27. The photographing optical lens assembly of claim 20, wherein there is an air space between every two lens elements of the first lens element, the second lens element, the third lens element, the fourth lens element and the fifth lens element that are adjacent to each other.

28. The photographing optical lens assembly of claim 27, wherein the first lens element has a convex object-side surface, a maximal field of view of the photographing optical lens assembly is FOV, and the following condition is satisfied:

$$110 \text{degrees} \le FOV \le 200 \text{degrees}.$$

29. The photographing optical lens assembly of claim 27, wherein a sum of axial distances between each two of the first lens element, the second lens element, the third lens element, the fourth lens element and the fifth lens element that are adjacent to each other is ΣAT, an axial distance between an object-side surface of the first lens element and the image-side surface of the fifth lens element is Td, and the following condition is satisfied:

$$\Sigma AT/Td < 0.50.$$

30. The photographing optical lens assembly of claim 27, wherein the object-side surface of the fourth lens element is convex.

31. The photographing optical lens assembly of claim 20, wherein the image-side surface of the fifth lens element comprises at least one concave shape in an off-axial region thereof.

32. The photographing optical lens assembly of claim 20, wherein the focal length of the photographing optical lens assembly is f, the focal length of the fourth lens element is f4, and the following condition is satisfied:

$0.80 < f/f4 < 2.0.$

33. The photographing optical lens assembly of claim 20, wherein a curvature radius of the image-side surface of the fourth lens element is R8, a curvature radius of the object-side surface of the fifth lens element is R9, and the following condition is satisfied:

$|(R8+R9)/(R8-R9)| < 100.$

34. The photographing optical lens assembly of claim 20, wherein the axial distance between the first lens element and the second lens element is T12, the axial distance between the third lens element and the fourth lens element is T34, and the following condition is satisfied:

$1.05 < T34/T12 < 2.5.$

35. The photographing optical lens assembly of claim 20, wherein the axial distance between the first lens element and the second lens element is T12, a distance in parallel with an optical axis from an axial vertex on the image-side surface of the first lens element to a maximum effective radius position on the image-side surface of the first lens element is Sag12, and the following condition is satisfied:

$1.0 < Sag12/T12 < 2.0.$

36. An image capturing device, comprising:
the photographing optical lens assembly of claim 20; and
an image sensor, wherein the image sensor is disposed on an image surface of the photographing optical lens assembly.

37. An electronic device, comprising:
the image capturing device of claim 36.

* * * * *